United States Patent [19]
Schneider et al.

[11] Patent Number: 5,365,154
[45] Date of Patent: Nov. 15, 1994

[54] APPLIANCE CONTROL SYSTEM AND METHOD

[75] Inventors: John K. Schneider, Snyder; Frank W. Keeney, Williamsville; Nicholas G. Leszczynski, Amherst; Benjamin H. Weppner, Williamsville, all of N.Y.

[73] Assignee: North Coast Electronics, Inc., Williamsville, N.Y.

[21] Appl. No.: 819,247

[22] Filed: Jan. 10, 1992

Related U.S. Application Data

[63] Continuation-in-part of Ser. No. 729,433, Jul. 12, 1991, abandoned.

[51] Int. Cl.[5] .......................... H02P 7/00; H02P 7/74; G08C 19/00
[52] U.S. Cl. .................. 318/103; 340/310 A; 340/310 R; 307/40; 307/115; 318/268
[58] Field of Search ............ 340/825.57, 825.62, 340/825.63, 825.64, 825.65, 825.69, 825.72, 310 R, 310 A, 310 CP; 307/38, 39, 40, 41, 112, 115; 318/16, 34, 53, 54, 55, 59, 66, 102, 103, 268

[56] References Cited

U.S. PATENT DOCUMENTS

| | | | |
|---|---|---|---|
| 4,322,632 | 3/1982 | Hart et al. | 307/41 |
| 4,371,814 | 2/1983 | Hannas | 318/16 |
| 4,398,178 | 8/1983 | Russ et al. | 307/3 |
| 4,430,576 | 2/1984 | Fowler | 307/38 |
| 4,465,956 | 8/1984 | Fowler | 318/268 |
| 4,521,843 | 6/1985 | Pezzolo et al. | 364/145 |
| 4,716,409 | 12/1987 | Hart et al. | 340/825.22 |
| 4,719,446 | 1/1988 | Hart | 340/310 A |
| 4,818,920 | 4/1989 | Jacob | 318/16 |
| 4,896,083 | 1/1990 | Kopala et al. | 318/268 |
| 4,935,736 | 6/1990 | Meierdierck | 340/825.69 |
| 4,990,908 | 2/1991 | Tung | 340/825.63 |
| 5,041,825 | 8/1991 | Hart et al. | 340/825.06 |

*Primary Examiner*—Bentsu Ro
*Attorney, Agent, or Firm*—Hodgson, Russ, Andrews, Woods & Goodyear

[57] ABSTRACT

A system and method for controlling an appliance, such as an indoor ceiling fan, including a controller operatively connected to the appliance motor for controlling its speed and direction of rotation in response to command signals, a control switch adapted to be located remote from the appliance such as a on a wall to provide command signals in response to manual inputs, and a communication link such as the existing a.c. power line, for transmitting command signals from the control switch to the appliance controller. The control switch is characterized by a plurality of operator members such as a keypad each providing no more than one distinct primary function command when manually operated and a processor for converting function commands provided by the operator members into speed and direction command signals for use by the appliance controller. The appliance controller comprises a processor for converting command signals received by the controller into signals for controlling the supply of motor current. The command signals transmitted from the control switch to the appliance controller over the a.c. power lines are digital signals generated by a pulse code modulation method. The appliance can have a lamp associated therewith and means for controlling the brightness thereof in response to commands from the control switch. The system can include a plurality of appliances and associated controllers whereupon the control switch provides address information for selecting particular ones or groups of the appliance controllers.

12 Claims, 34 Drawing Sheets

APPLIANCE CONTROL SYSTEM AND METHOD

CROSS REFERENCE TO A RELATED APPLICATION

This application is a continuation-in-part of pending application Ser. No. 07/729,433 filed Jul. 12, 1991 and entitled "Appliance Control System And Method", abandoned.

BACKGROUND OF THE INVENTION

This invention relates to the art of controlling the supply of electrical power to appliances, and more particularly to a new and improved system and method for controlling appliances in plural modes of operation from a remote location.

One area of use of the present invention is controlling indoor overhead ceiling mounted fans which have electrical lamps, although the principles of the present invention can be variously applied. The modes of operation of such fans include different speeds of rotation together with forward and reverse directions of rotation. The lamp modes of operation include various levels of brightness.

One disadvantage of control systems heretofore available is that they assign multiple primary functions to the wall switch control buttons, requiring the operator to memorize certain operating procedures such as multiple depressions of a button or pressing and holding a button down for several seconds. It would, therefore, be highly desirable to provide a control system for ceiling fans which eliminates multiple primary function wall switch buttons so that any user can operate the system immediately whether or not he is familiar with the system.

Another disadvantage of control systems heretofore available is that they require 3-wire cable between wall switch units in a 3-way hookup, and many which control both a fan and a lamp attachment require 3-wire cable from the wall unit to the fan. It would be highly desirable to provide a system requiring only 2-wire cabling throughout, with the added feature of no neutral required for enhanced simplicity of installation.

Additional advantageous features in such a control system include addressability of appliances or groups thereof by means of the wall switches, memory storage and recall of various operational settings, and safety features such as automatic power shut off when fan blade rotation ceases and in response to lamp burn-out, damage or other failure.

SUMMARY OF THE INVENTION

It is, therefore, a primary object of this invention to provide a new and improved appliance control system and method.

It is a further object of this invention to provide such a system and method enabling clear and simple control while achieving a high degree of functionality.

It is a more particular object of this invention to provide such a system and method which allows any user to operate the system immediately whether or not he is familiar with the system.

It is a more particular object of this invention to provide such a system and method featuring simplicity of use through elimination of multiple primary function manipulations and clear presentation of manually selectable commands to the operator.

It is a further object of this invention to provide such a system and method which controls speed and direction of the appliance control and brightness of an attached lamp in a simple straight forward manner with ease of operation.

It is a further object of this invention to provide such a system and method which requires only 2-wire cabling throughout and which also has no-neutral capability.

It is a more particular object of this invention to provide such a system and method which has a sufficient number of control commands while at the same time providing clear and concise method of operation.

It is a more particular object of this invention to provide such a system and method having an addressing capability whereby a plurality of appliances and/or groups are thereof controlled from a single location.

It is a more particular object of this invention to provide such a system and method having memory storage and recall of various operational settings;

It is a more particular object of this invention to provide such a system and method having automatic power shut off when fan blade rotation ceases and in response to lamp burn-out, damage or other failure.

It is a more particular object of this invention to provide such a system and method which controls the speed of the appliance motor in a manner which minimizes the acoustic output of the motor.

The present invention provides a system and method for controlling an appliance, such as an indoor ceiling fan, including a controller operatively connected to the appliance motor for controlling its speed and direction of rotation in response to command signals, control switch means adapted to be located remote from the appliance such as on a wall to provide command signals in response to manual inputs, and means for providing a communication link, preferably the existing a.c. power line, for transmitting command signals from said control switch means to the appliance controller. The communication link between control switch and appliance controller and other system electrical interconnections advantageously require only 2-wire cabling and also have no neutral capability. The control switch means is characterized by a plurality of operator members each providing no more than one distinct primary function command when manually operated and processor means for converting function commands provided by the operator members into speed and direction command signals for use by the appliance controller. In particular, the operator members are buttons of a keypad and the processor is a microprocessor. The appliance controller comprises means for controlling the supply of current to the motor and processor means for converting command signals received by the controller into signals for controlling the current supply means. The command signals transmitted from the control switch means to the appliance controller over the a.c. power lines are digital signals generated by a pulse code modulation method characterized by phase control on the negative excursion of the a.c. cycle. The appliance can have a lamp associated therewith and means for controlling the brightness thereof whereupon the control switch means includes additional operator members providing distinct brightness commands and the processor means converts those commands into brightness command signals for use by the controller and the processor means of the controller converts brightness command signals received by the controller into signals for controlling the brightness of the lamp.

The system can include a plurality of appliances and associated controllers whereupon the control switch means includes manually operated means for providing input address information to the processor means for providing address signals for selecting particular ones or groups of the appliance controllers and the processor means of each controller includes means responsive to a particular address signal for selecting that particular controller. There is also provided electrically operated heater means operatively associated with the motor for maintaining the temperature of the motor bearings at a level sufficient to prevent condensation. The system also includes a fan blade rotation sensor and means operatively associated therewith for shutting off electrical power to the fan if the blades are not rotating. For safety purposes, the lamp circuit is monitored and if the circuit opens due to bulb burnout, breakage, damage or an electrical failure, power to the lamp circuit automatically is shut off. To extend the useful life of the lamp, the fan controller provides a ramping voltage to the lamp when power is applied to eliminate the thermal shock associated with bulb burn-out. When the fan motor is turned on or when speed selection is increased, the system applies a short surge of power to bring the blade rotation quickly up to speed. A resistive network is employed for quiet fan speed control.

The foregoing and additional advantages and characterizing features of the present invention will become clearly apparent upon a reading of the ensuing detailed description together with the included drawing wherein.

Figure 7A:
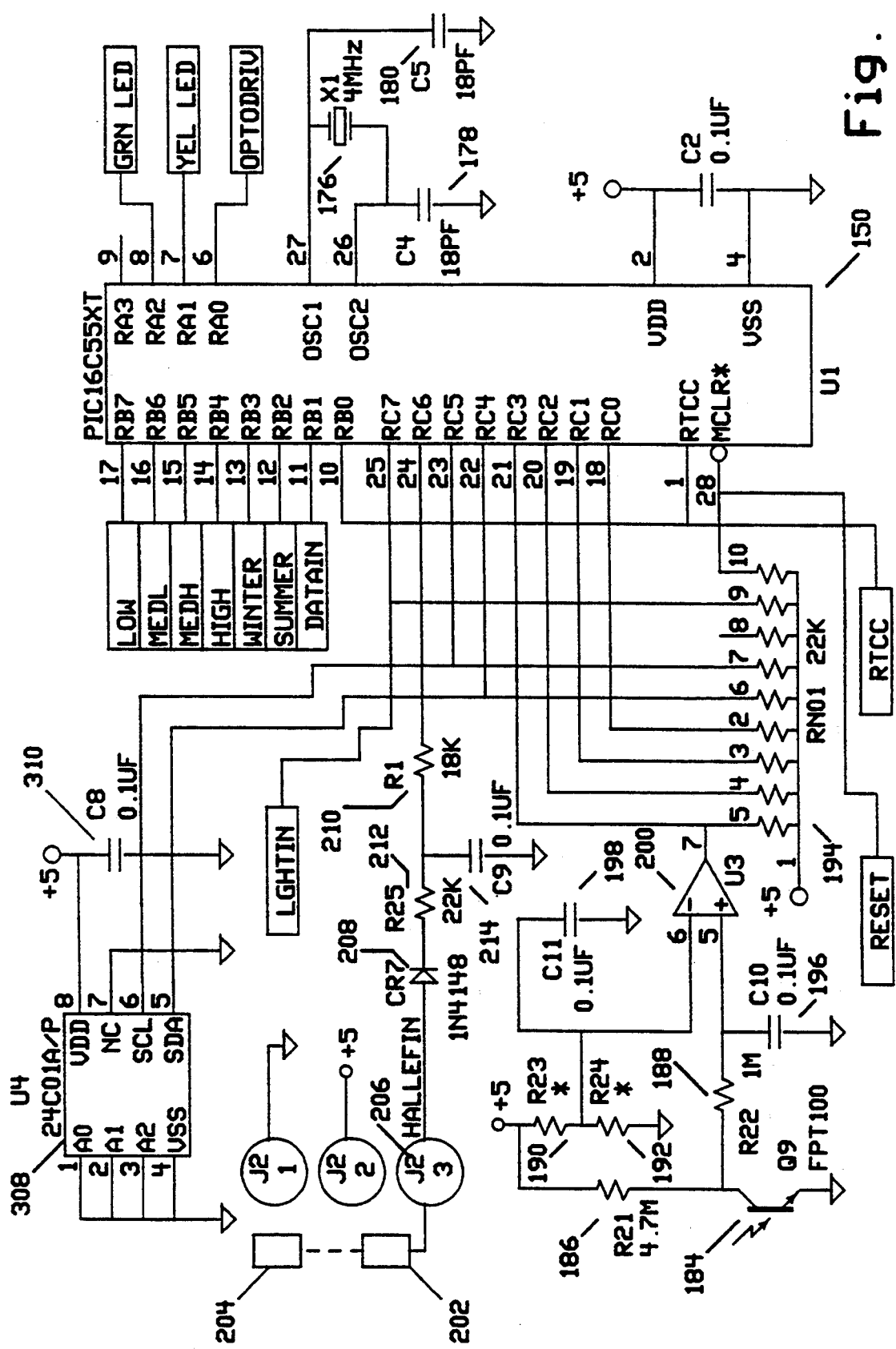
Figure 7A:
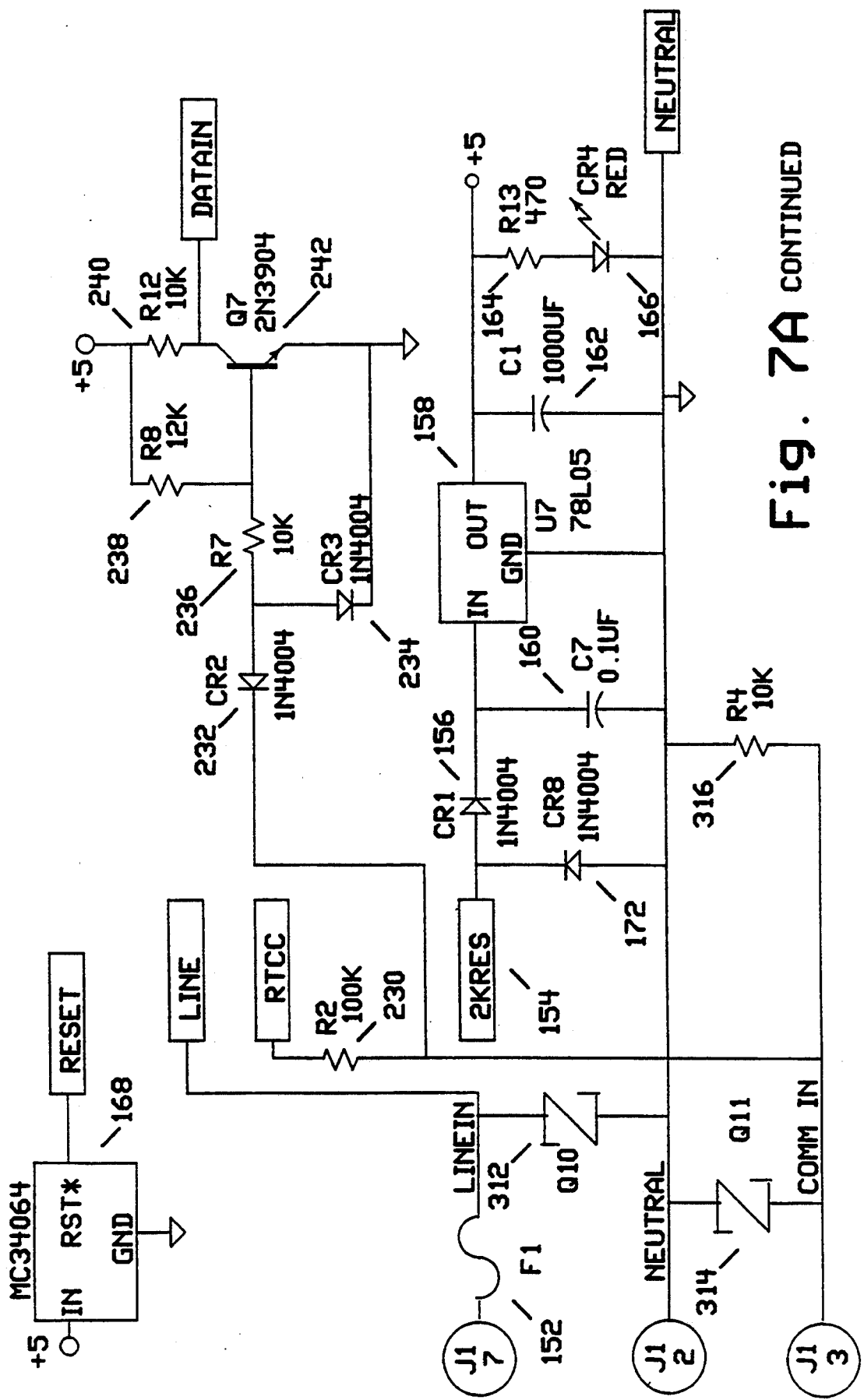
Figure 7A:
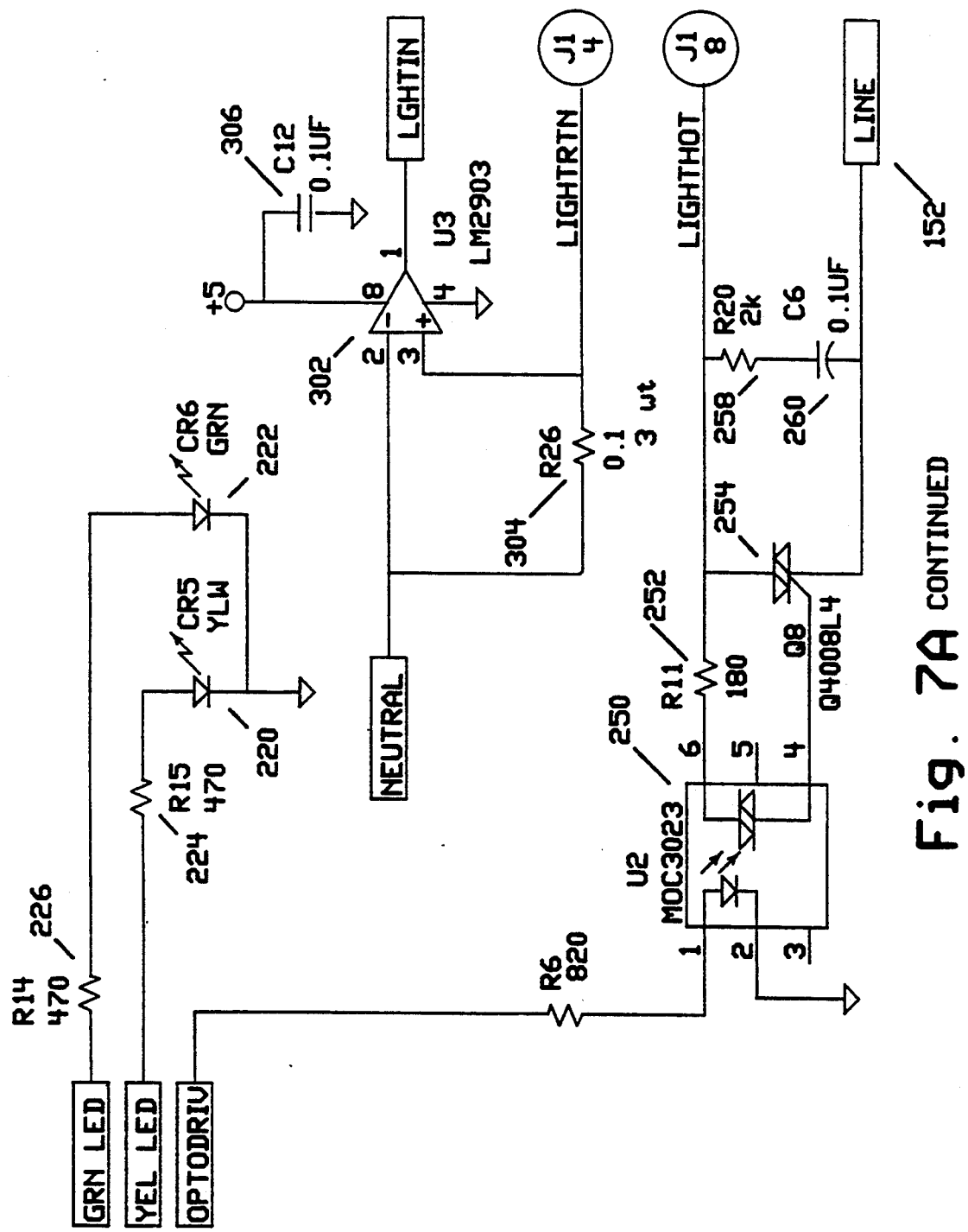
Figure 7B:
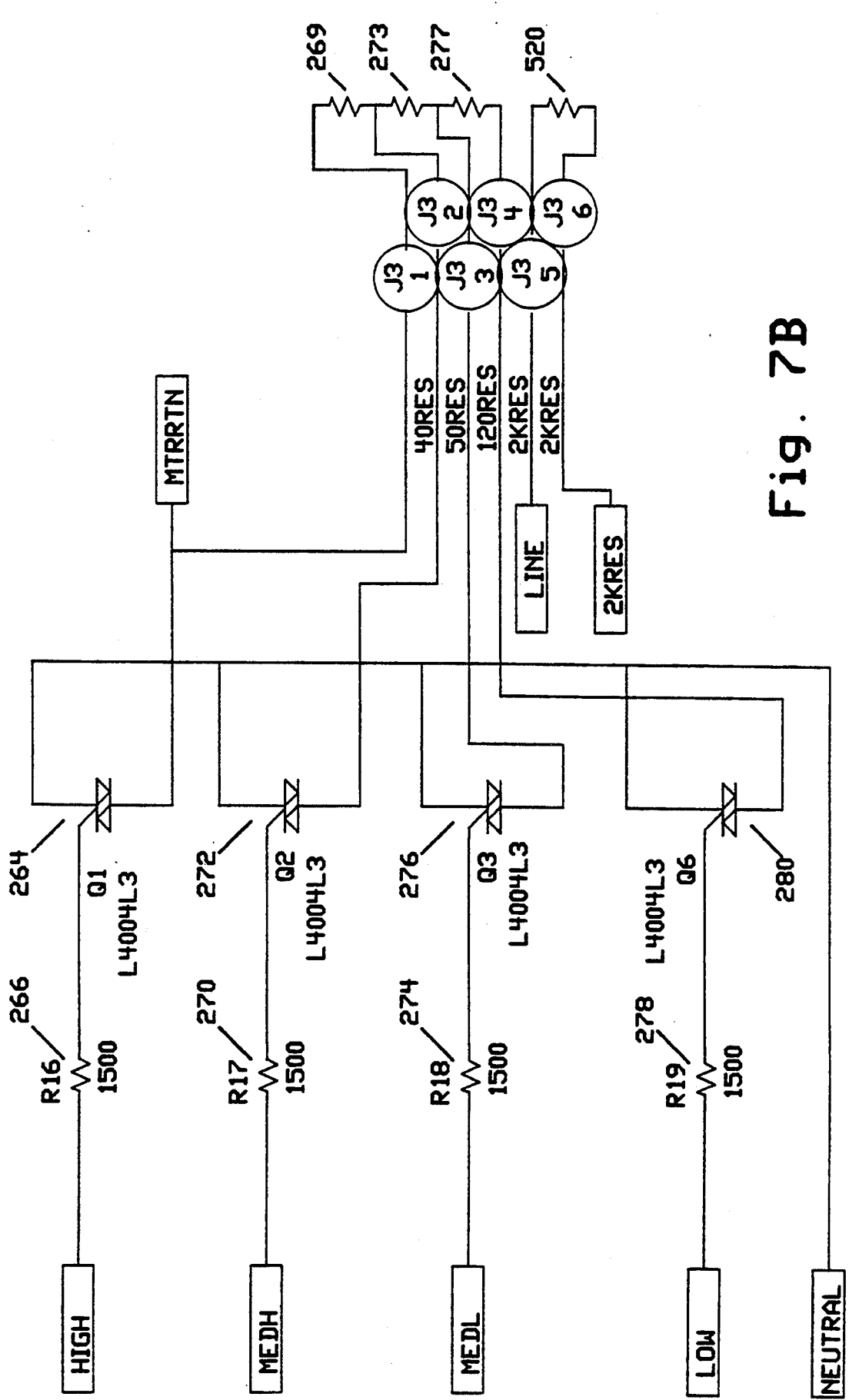
Figure 7B:
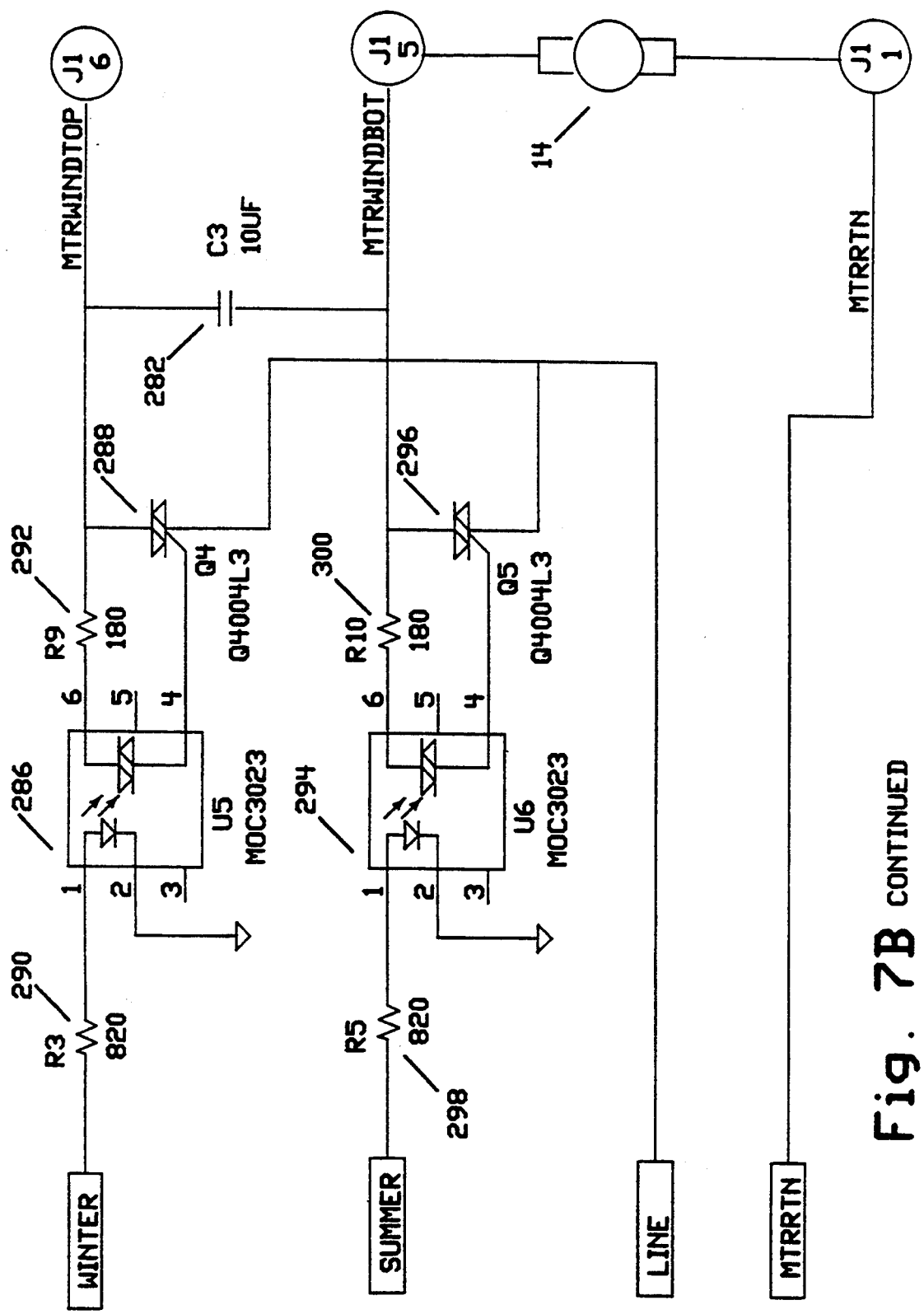
Figure 8A:
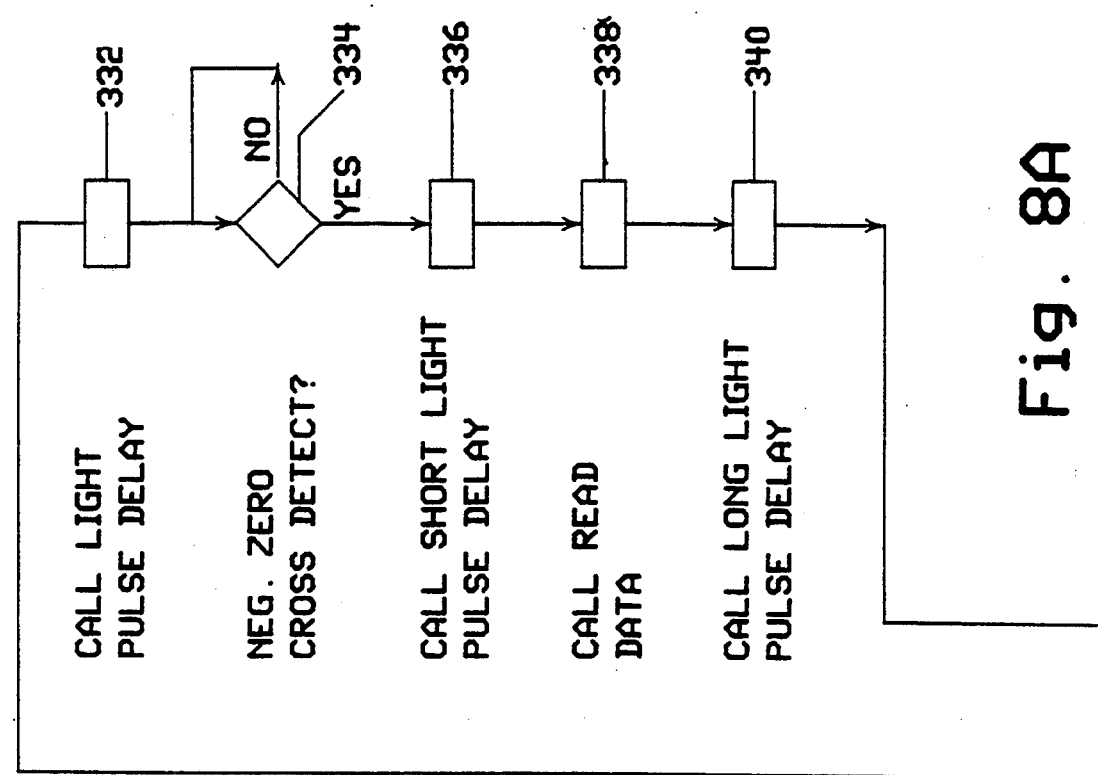
Figure 8A:
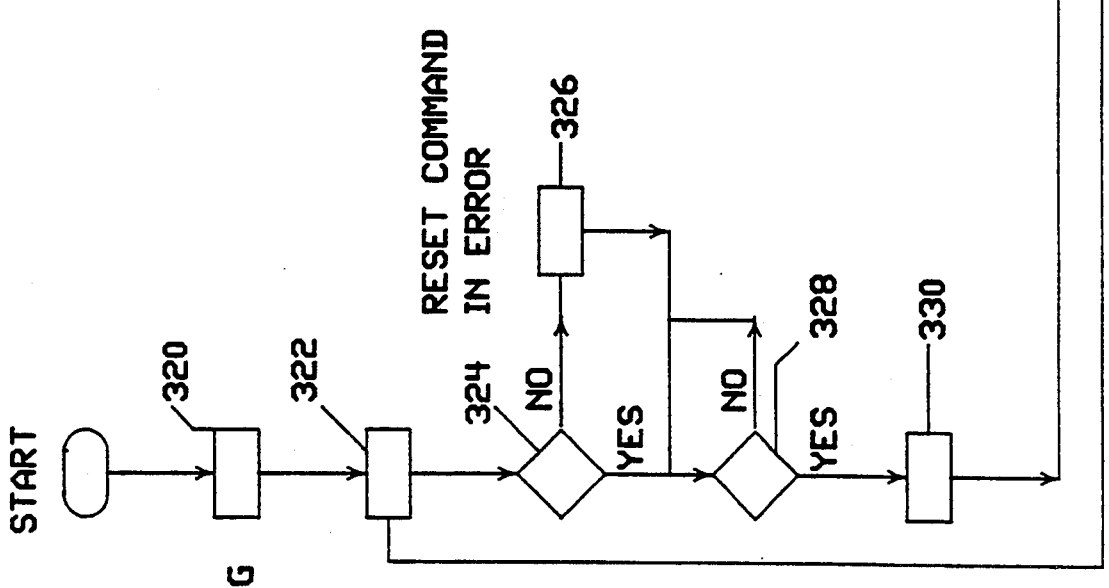
Figure 8A:
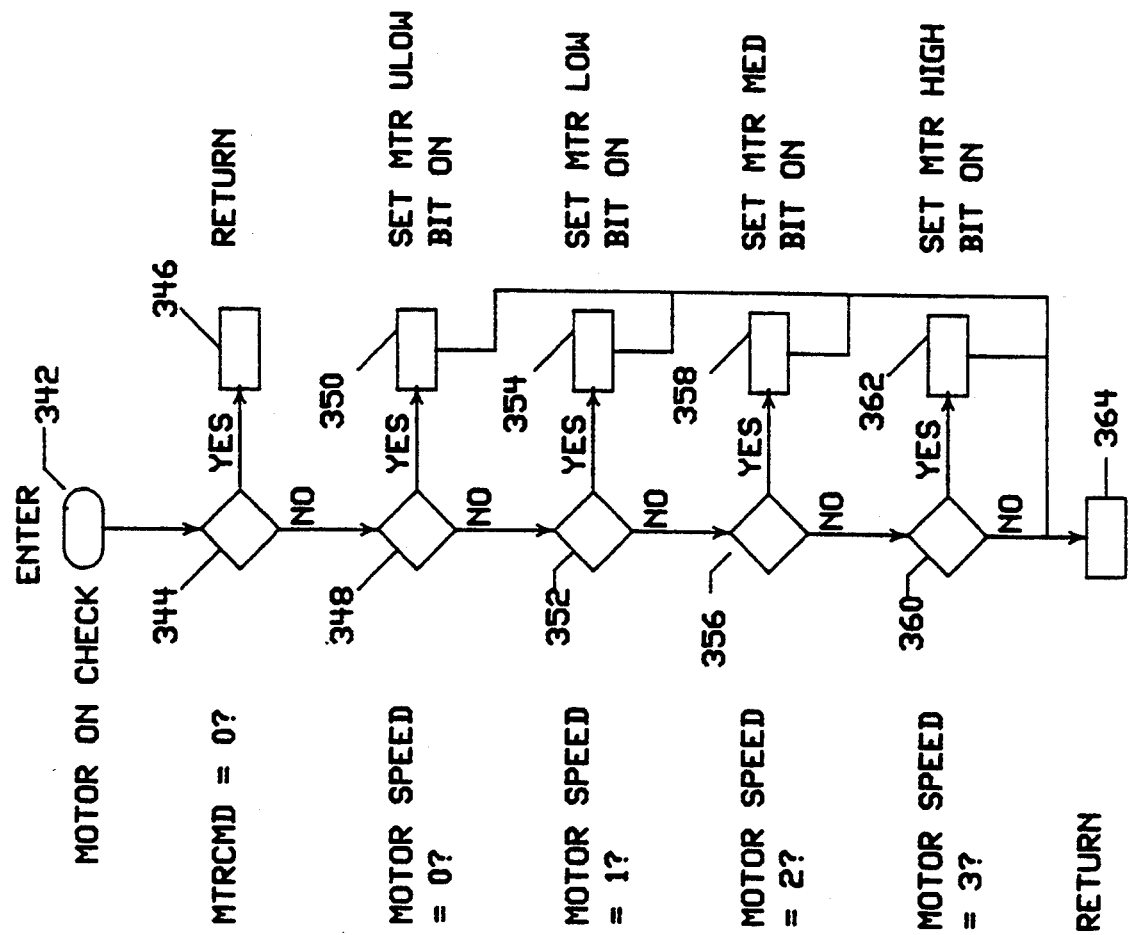
Figure 8A:
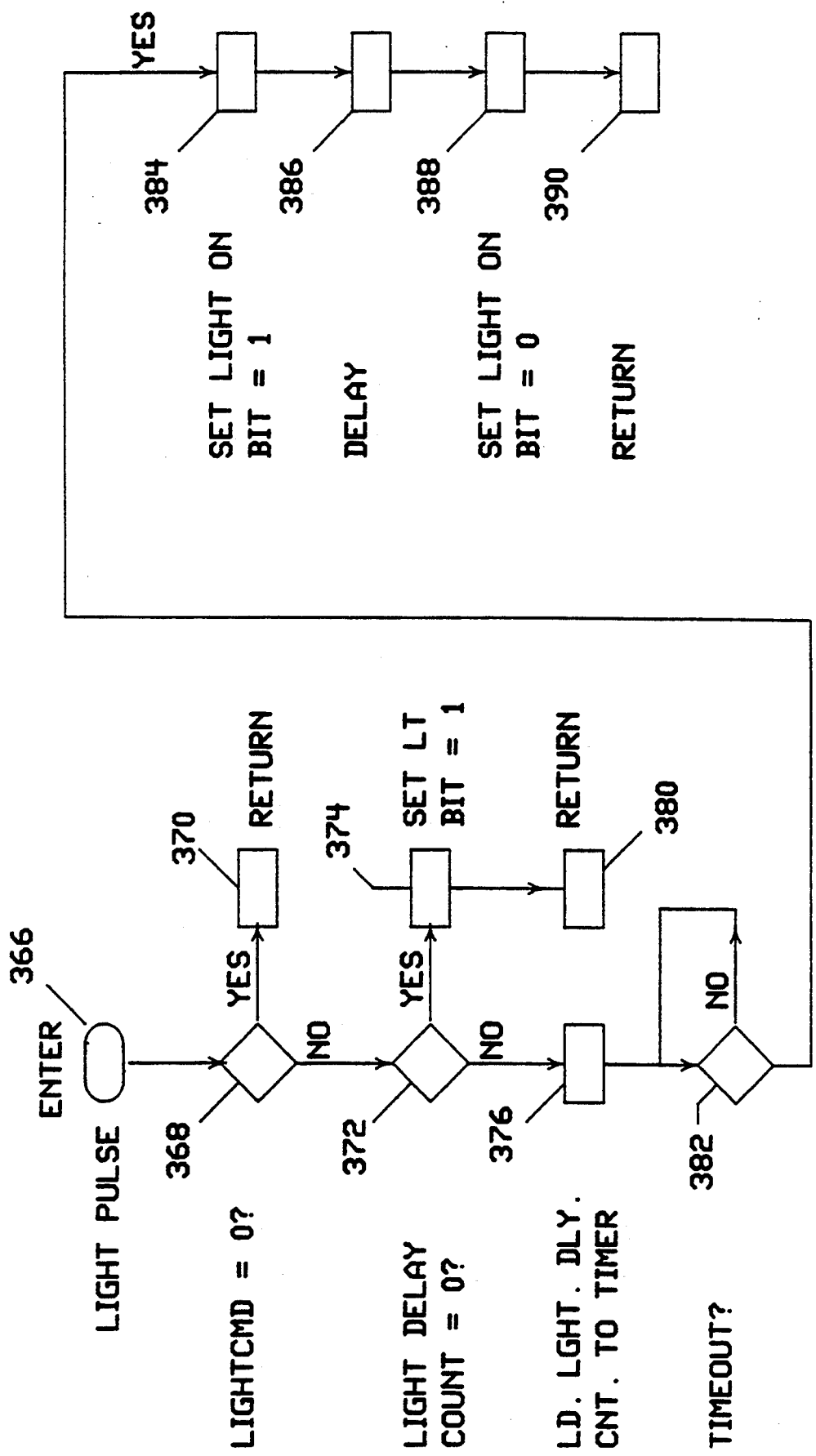
Figure 8B:
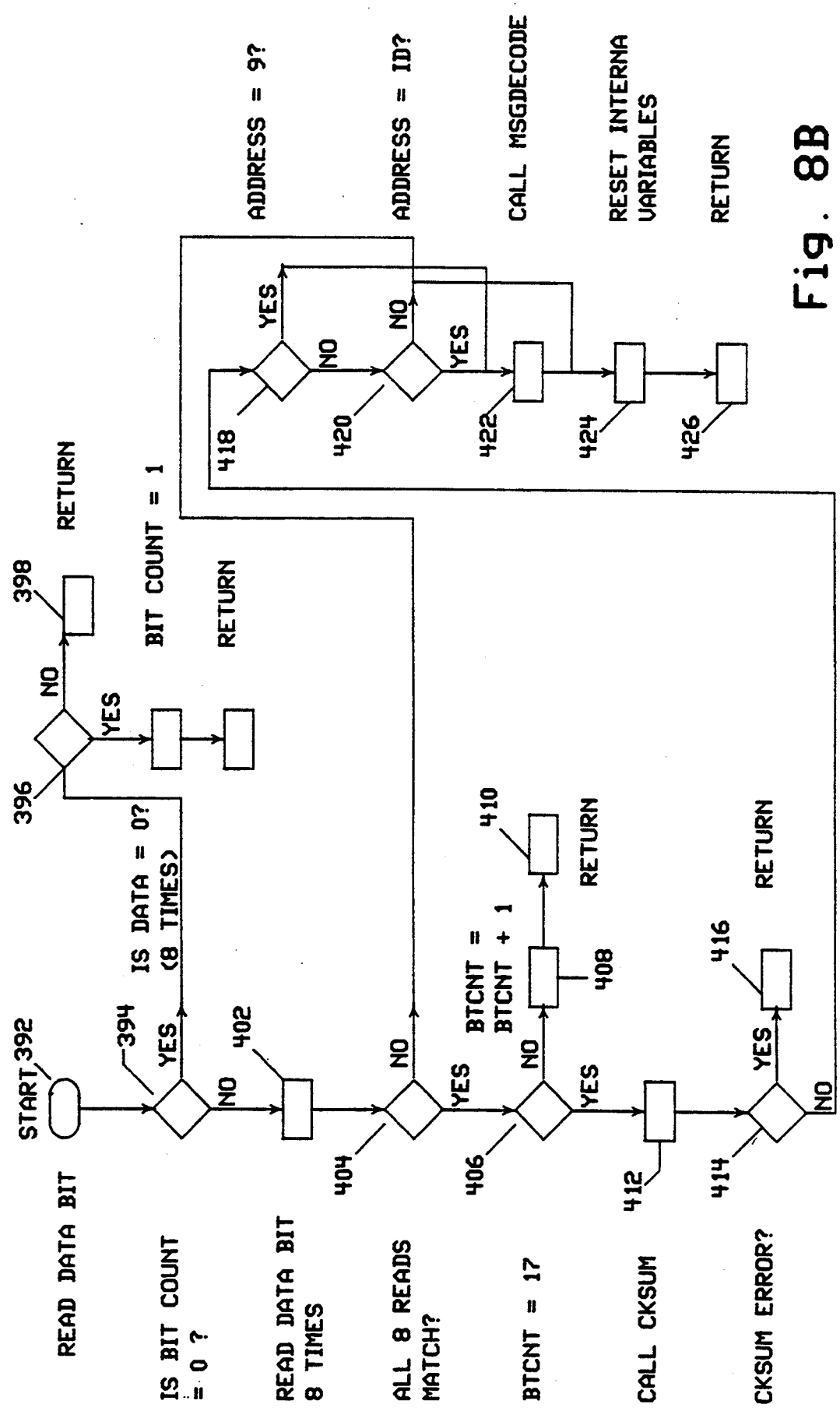
Figure 8B:
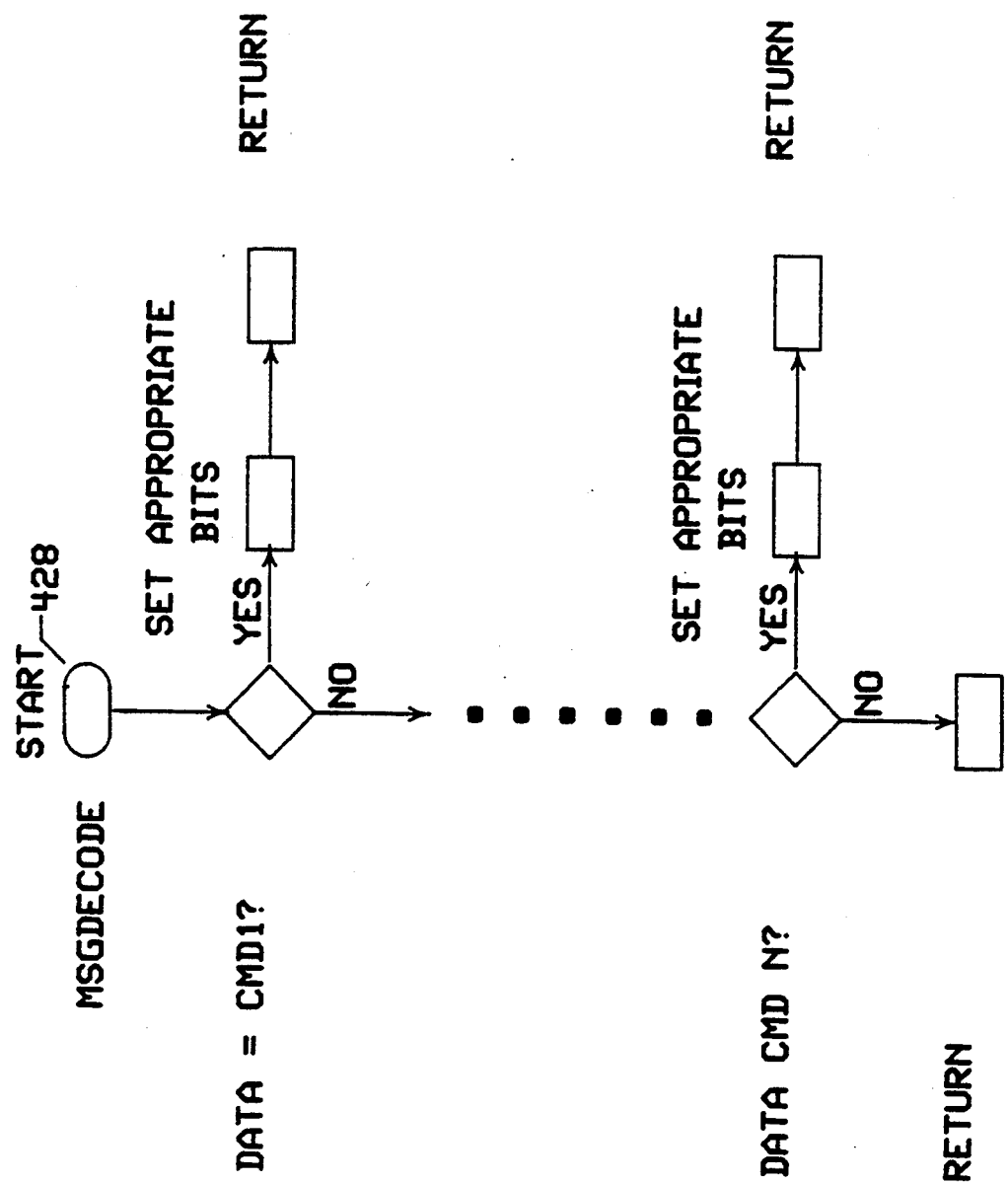
Figure 8C:
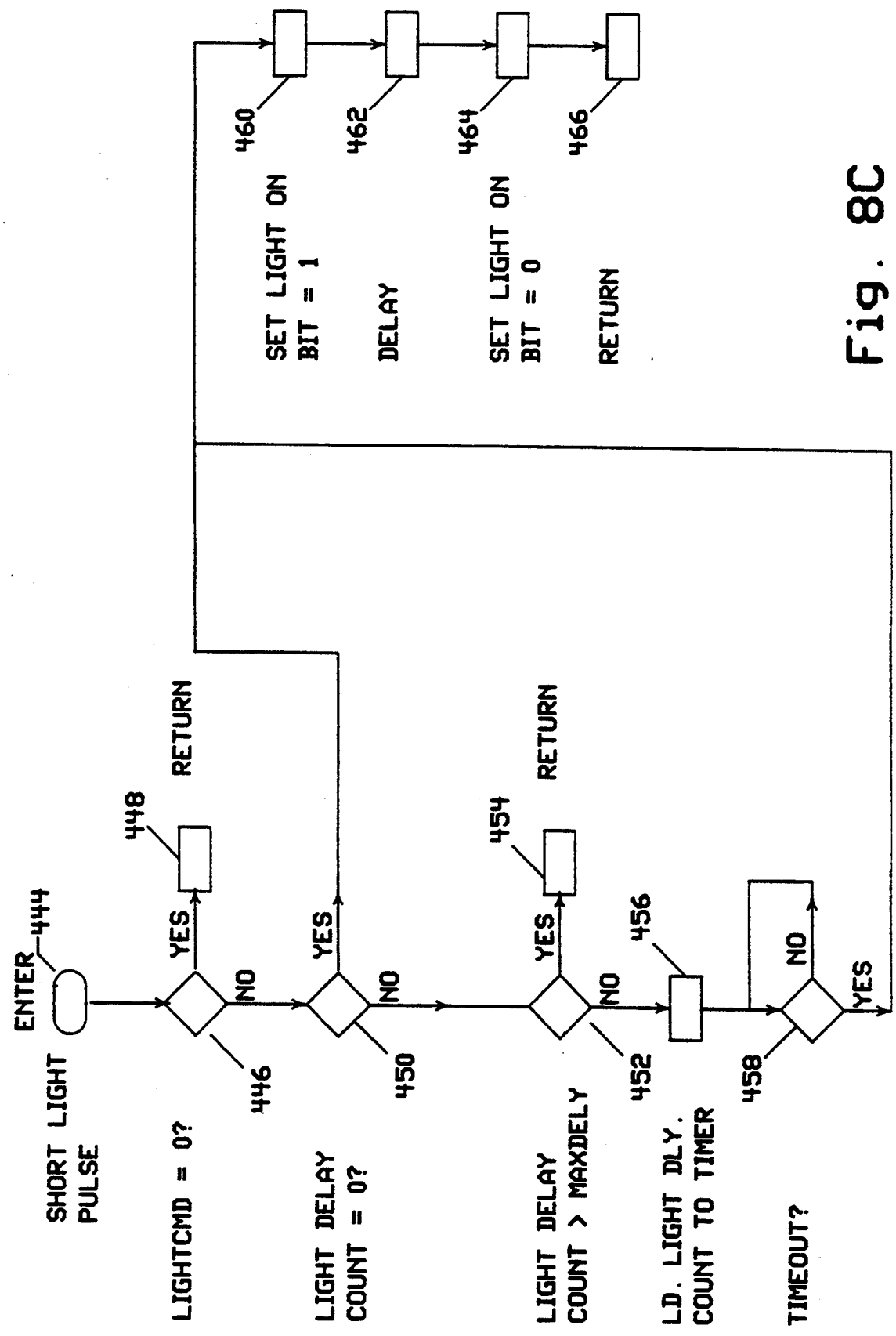
Figure 8C:
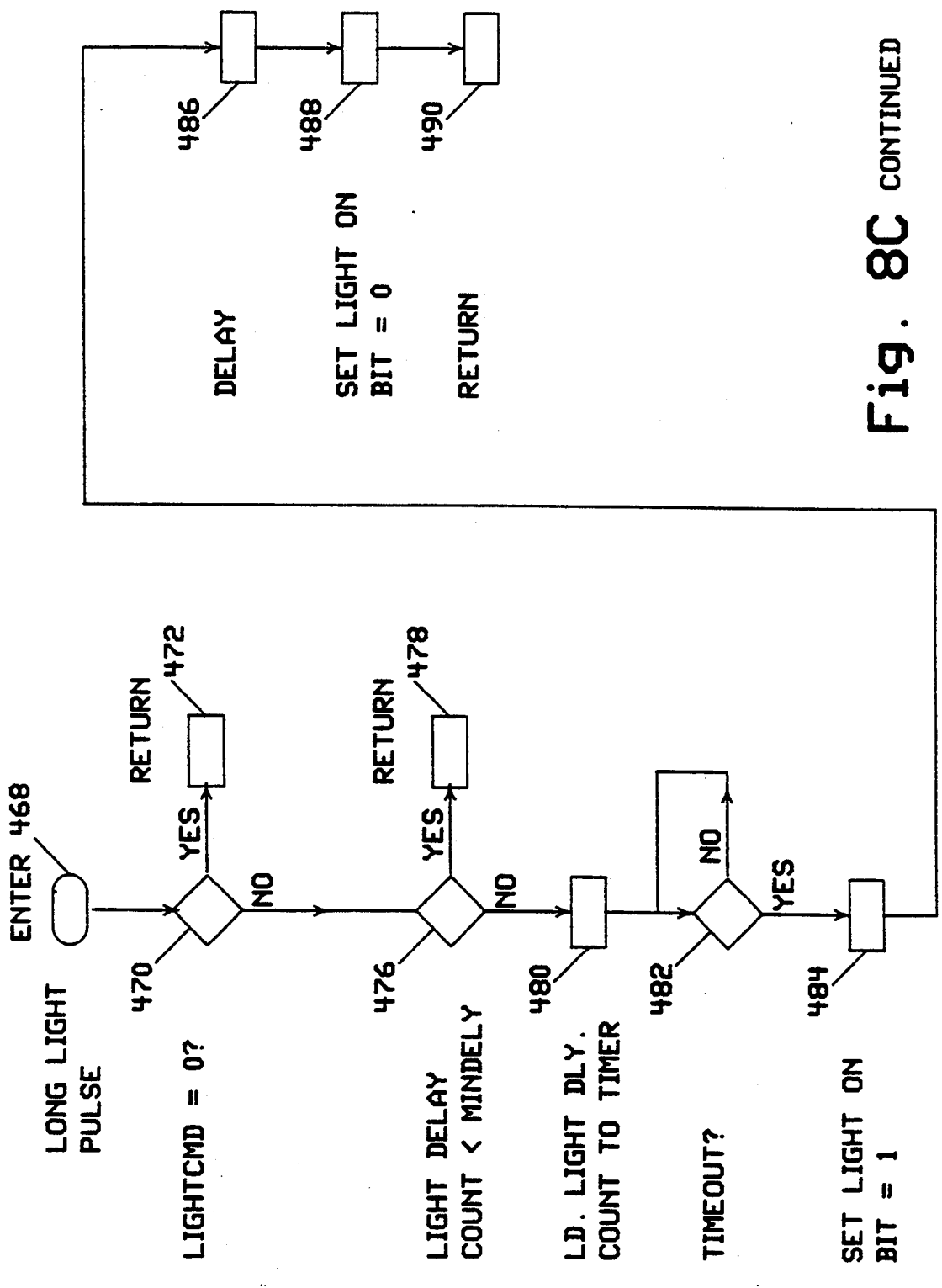
Figure 8C:
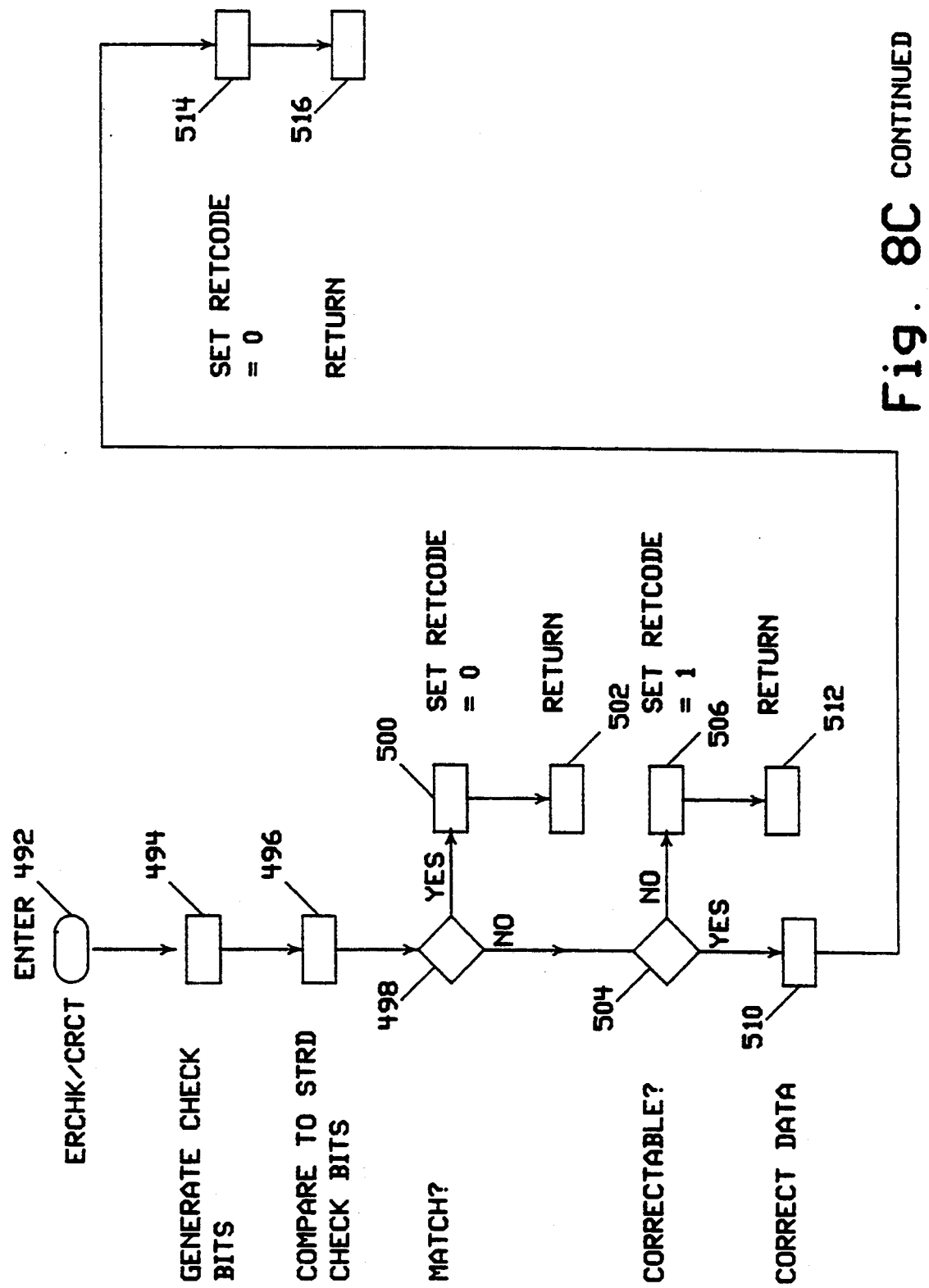
Figure 9:
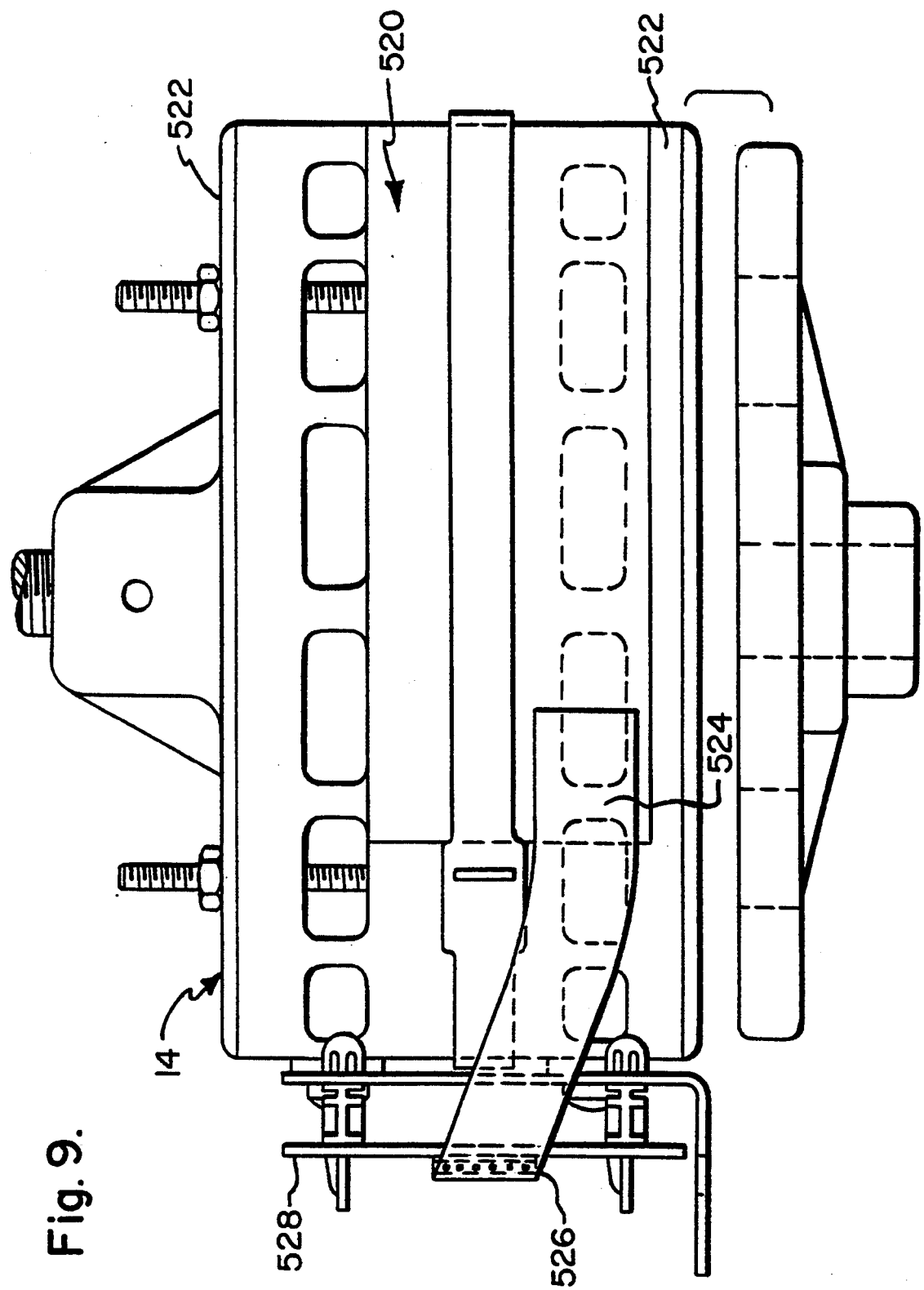

FIG. 7A and B comprise a schematic diagrams of the implementation of the fan controller in the system of the present invention;

FIGS. 8A, 8B and 8C comprise a program flow chart illustrating operation of the fan controller of FIGS. 7A and 7B;

FIG. 9 is an elevational view of a fan motor provided with electrically operated heating means for anti-condensation according to the present invention; and FIGS. 10–17 are wiring diagrams illustrating various alternatives for installing the system of the present invention.

DETAILED DESCRIPTION OF THE ILLUSTRATED EMBODIMENT

Figure 1A:
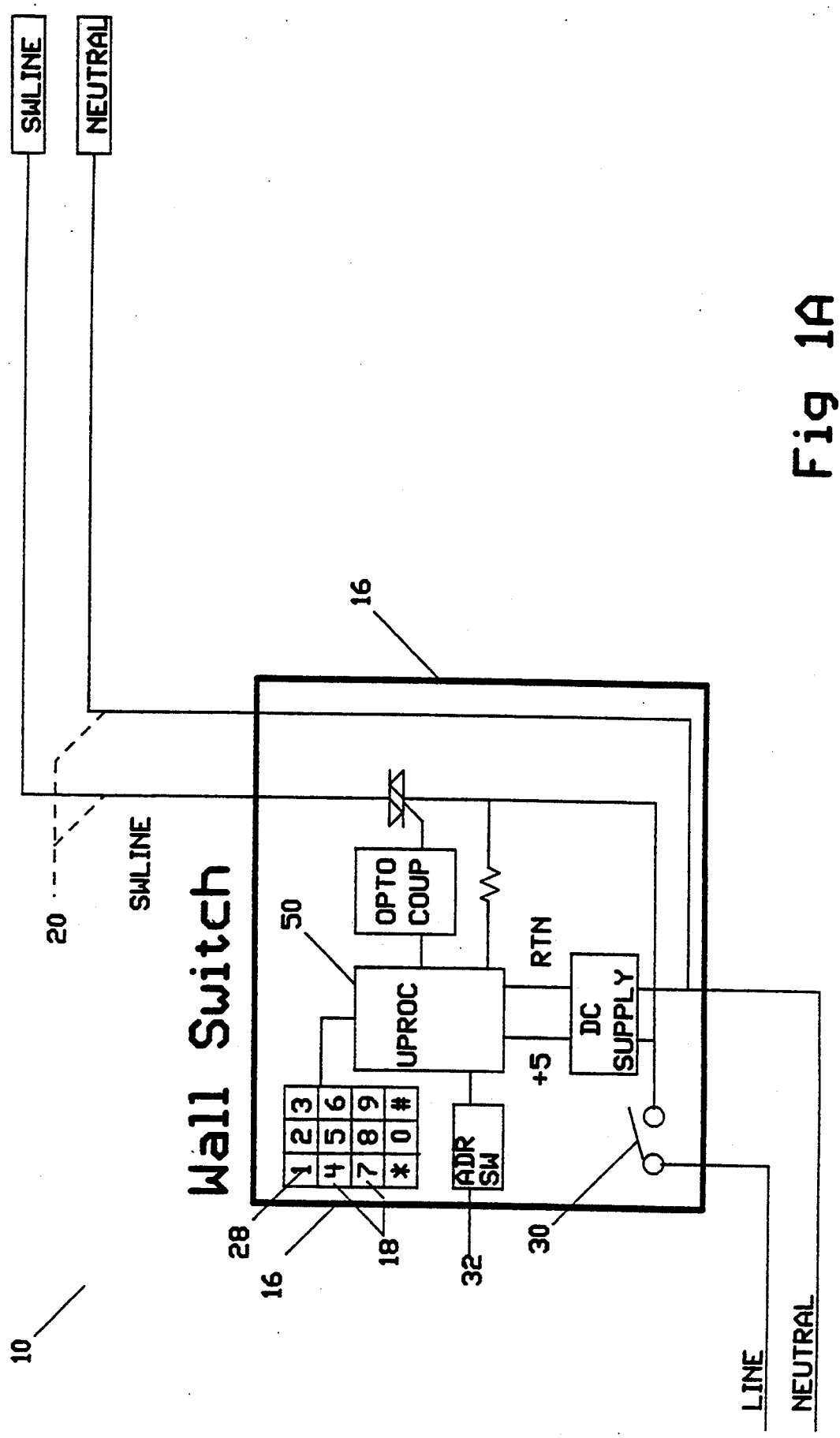
FIGS. 1A and 1B are schematic block diagrams of the control system of the present invention in neutral and no neutral wiring configurations, respectively.
Figure 1A:
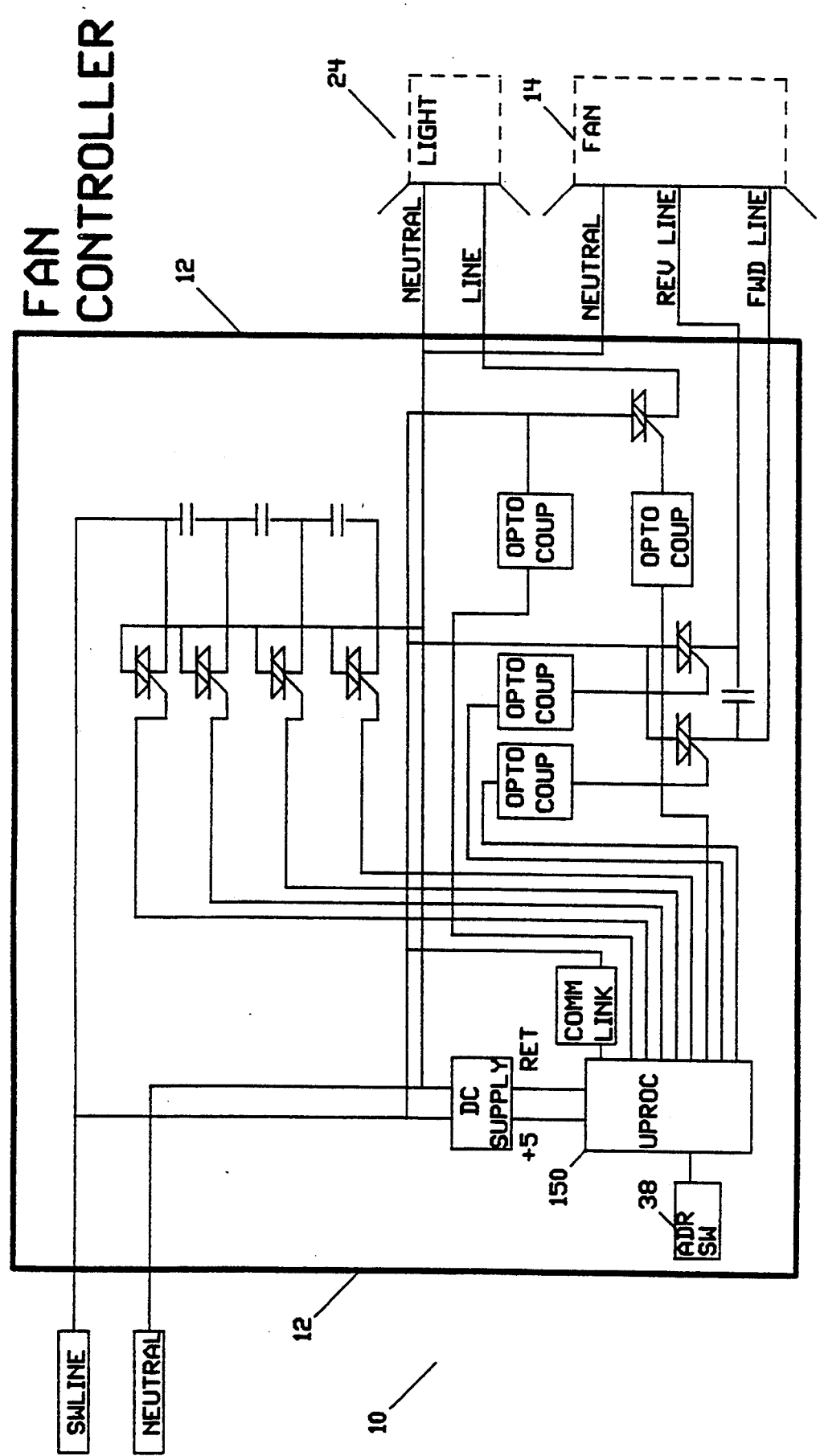
Figure 1B:
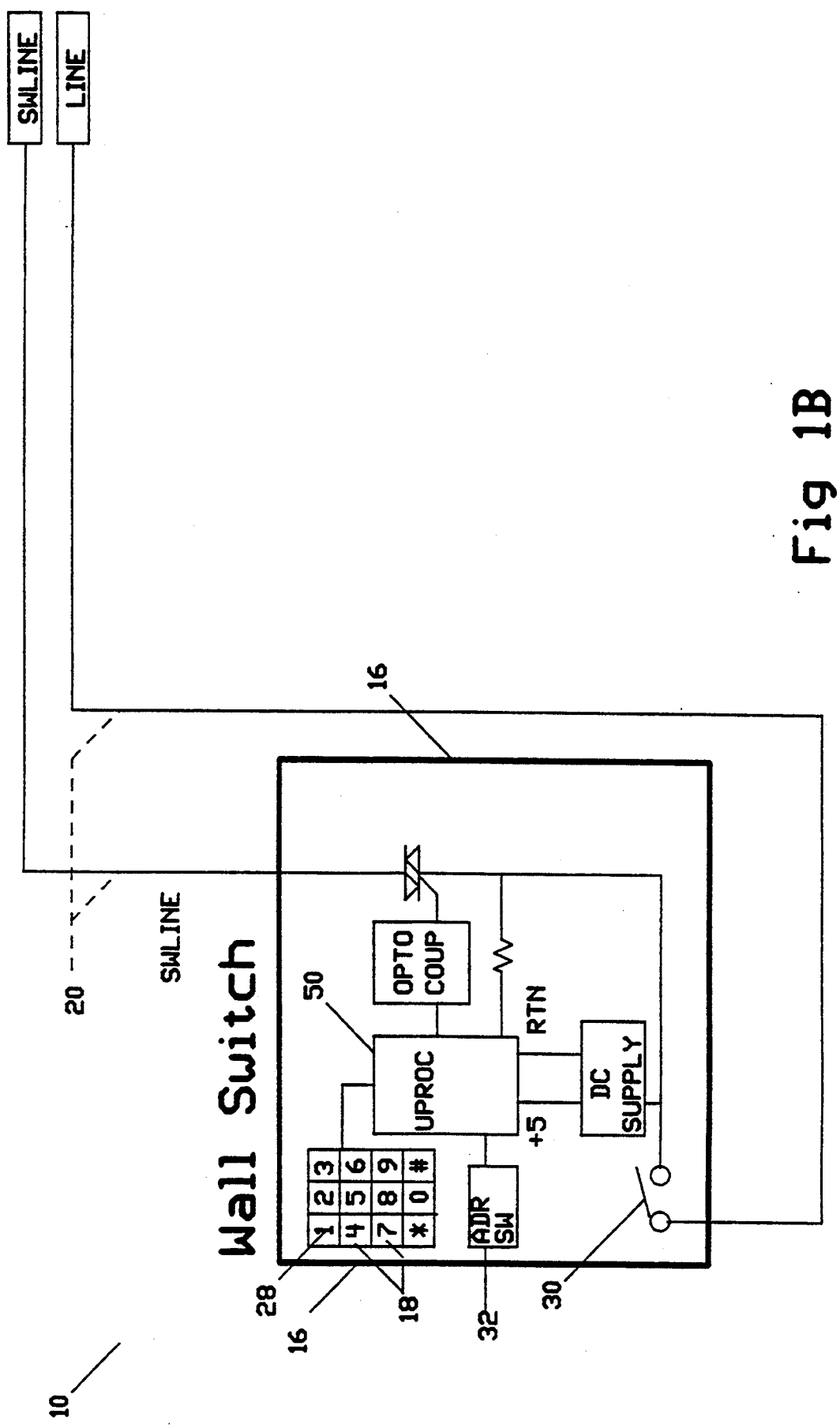
Figure 1B:
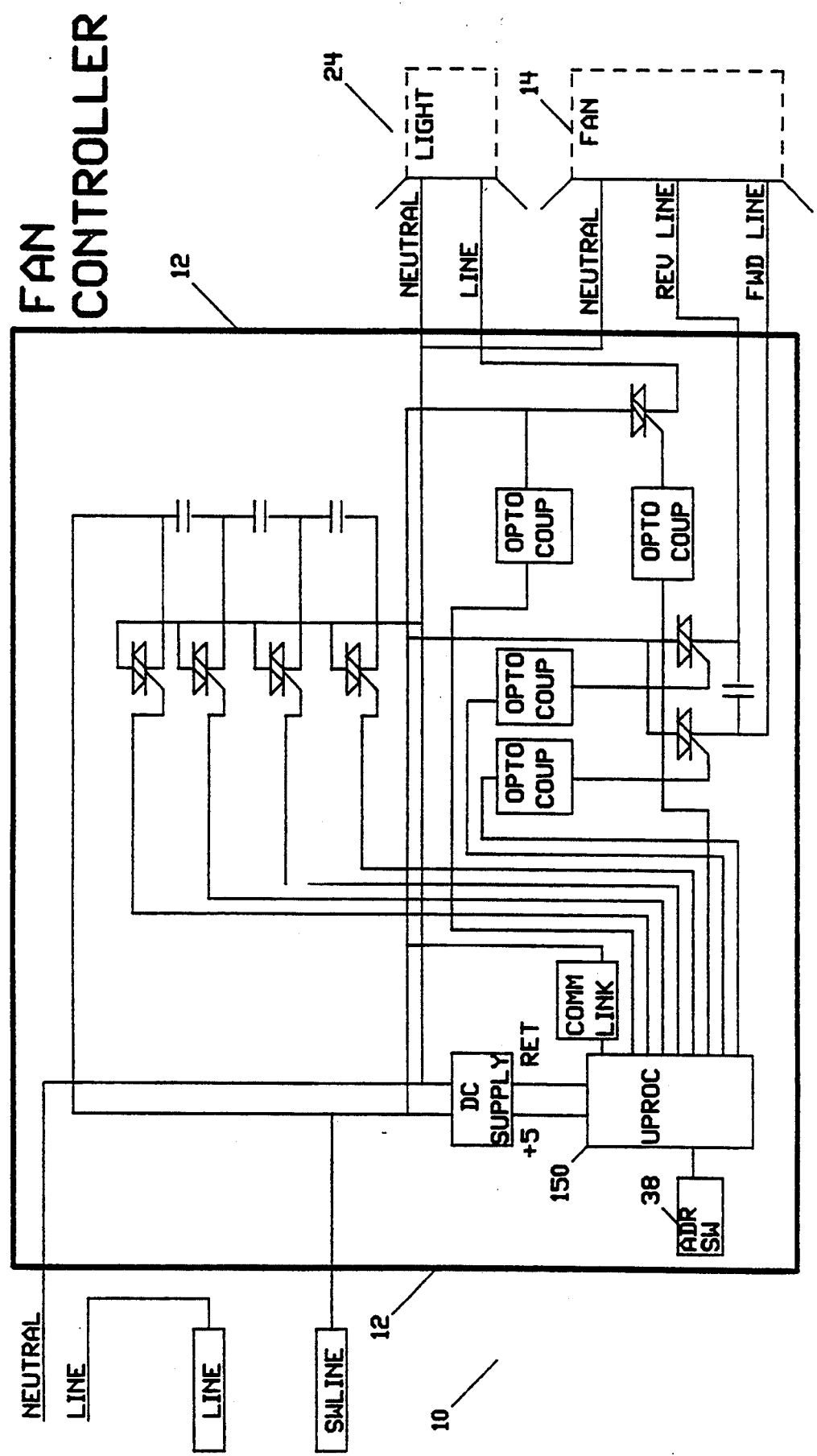

Referring now to FIGS. 1A and 1B there is shown the appliance control system 10 of the present invention for use with an overhead ceiling fan having a lamp associated therewith in a known manner. While only one fan and associated lamp are shown for simplicity of illustration, the system of the present invention has the capability of controlling operational parameters of a plurality of fans and associated lamps. In particular, FIG. 1A shows the system wired in a neutral configuration and FIG. 1B shows the system wired in a no-neutral configuration. The system 10 comprises, briefly, a fan controller 12 operatively connected to the motor 14 of a ceiling fan (not shown) for controlling the speed and direction of rotation of the fan in response to command signals received by the controller. The system 10 further comprises control switch means 16 adapted to be located remote from the fan such as on a wall and including a plurality of operator members generally designated 18 for providing functional or operational commands when manually operated as will be described. The system 10 also comprises means 20 for providing a communication link between control switch 16 and fan controller 12 for transmitting command signals from control 16 to fan controller 12. In the system of the present illustration, communication link 20 is provided by the a.c. power line between wall switch 16 and fan controller 12. In addition, the system requires only 2-wire cabling throughout.

Thus, the control system comprises two assemblies: a wall switch and a fan controller. The wall switch is the assembly that mounts in the wall which the operator uses to control the speed and direction of the fan along with the brightness of a lamp 24 associated with the fan. The fan controller is another assembly which mounts internal to the fan. The fan controller is responsible for receiving commands from the wall switch and acting on these commands. A detailed description of each of these assemblies and how they interact will be presented further on in the specification.

In accordance with the present invention, each of the operator members 18 of wall switch 16 provides no more than one distinct primary function command when manually operated. The operator members 18 comprise buttons of a keypad generally designated 28. Wall switch 16 further comprises means in the form of microprocessor 50 for converting function commands provided by operator members 18 into speed and direction command signals for use by fan controller 12 and brightness control signals for controlling brightness of the lamp associated with the fan. In addition, fan controller 12 includes means in the form of microprocessor 30 for converting command signals received by controller 12 into signals for controlling the supply of current to the fan motor and signals for controlling the brightness of the lamp.

The control system of the present invention has two basic forms, referred to as the non-addressable system and the addressable system. These systems control appliance groups with each group consisting of one or more appliances, i.e. fans. The non-addressable system is a system in which one or more wall switches 16 controls a single ceiling fan group. All ceiling fans in this configuration respond identically. It is a very basic system that provides low cost ceiling fan control. The addressable system is similar to the non-addressable system but with the capacity of independently controlling a number, for example eight, fan groups from a single wall switch. Since both types of systems employ the same technology and share the same design principles, understanding the addressable system will allow immediate understanding of the non-addressable system. Therefore, only the addressable system will be described herein, and any differences between this and the non-addressable system shall be discussed in the appropriate sections. The fan controller 12 is identical for both systems.

The wall switch 16 and fan controller 12 operate together to obtain the desired functionality, and the objective of the control system 10 is to provide clear and simple control for ceiling fans while achieving a degree of functionality not heretofore available. The wall switch 16 is the assembly which the operator uses to send control commands to the fan controller. The wall switch 16 must be flexible enough to allow a sufficient number of control commands to be sent to the fan controller 12 and at the same time provide a clear concise method for operation. The overall goal is to allow any user to be able to immediately operate the system 10 whether or not they are familiar with the system.

In the system 10 of the present illustration, four different speed settings are capable of being sent by the wall switch 16 and the speed settings will be referred to as Ultra Low, Low, Medium and High. The RPM of the fan 14 at each of these settings is approximately as set forth in Table 1.

TABLE 1

| FAN SPEED SETTINGS | |
|---|---|
| Setting | RPM |
| High | 200 |
| Medium High | 150 |
| Medium | 100 |
| Low | 25 |

The selection of the individual speed settings is determined solely from the wall switch 16 and does not require visual observation of the fan 14 itself. Turning the fan 14 ON and OFF does not affect the current speed setting of the fan. Therefore, fan 14 may be turned ON and OFF at any predetermined speed level. Furthermore, the speed setting of fan 14 can be adjusted prior to turning the fan on. That is, should the speed of the fan be either unknown or at a setting that is undesirable, it can be changed to the desired speed prior to turning the fan on. The direction of fan 14 can be altered by means of wall switch 16. The direction in which fan 14 is spinning is determined solely from wall switch 16 and does not require visual observation of the fan itself. Turning fan 14 ON and OFF does not affect the current direction setting of the fan. Therefore, fan 14 may be turned ON and OFF at either predetermined direction. Furthermore, the direction of fan 14 can be changed prior to turning the fan on. Thus, should the direction of fan 14 be either unknown or in the unwanted direction, then the direction can be changed prior to turning the fan on.

The system 10 of the present invention also has the capability of controlling a lamp 24 associated with fan 14, such lamps typically being located centrally of the ceiling fan for illuminating the region below in a known manner. Fan controller 12 includes means for controlling the brightness of lamp 24 in response to command signals received thereby as will be described, and additional ones of the operator members 18 in wall switch 16 initiate commands which are converted into brightness command signals for use by the brightness control means in fan controller 12 as will be described. The brightness of lamp 24 is continuously, or nearly continuously, controlled from its minimum value to its maximum value. Turning lamp 24 ON and OFF does not affect the current brightness level setting of the lamp. Therefore, lamp 24 may be turned ON and OFF at any predetermined brightness level. Furthermore, the brightness level of lamp 24 can be adjusted prior to turning the lamp on. That is, should the brightness setting of lamp 24 be either unknown or undesirable, then the level can be changed prior to turning the lamp on.

In the system 10 of the present illustration, eight fan groups are capable of being controlled independently by a single wall switch 16. These groups are identified individually, each by a unique address. This address is entered in the wall switch 16 prior to sending a command to the fan controller 12 in a manner which will be described. The wall switch also has the ability to address all fan groups simultaneously in what is designated the ALL setting, and to issue up to four user pre-programmed settings to all fan groups in what is designated the MEMORY setting. These modes of operation will be described in further detail presently. In the case of the non-addressable system, there is only the capability to control a single fan group independently and therefore no addressing capability exists.

The fan controller 12 is the assembly that mounts internal to the ceiling fan 14 and is directly responsible for controlling the speed and direction of the fan 14 and the brightness of the lamp 24. The fan controller 12 receives its control information from the wall switch 16, decodes this information, and performs the necessary action to achieve the desired response from the lamp and fan motor respectively. The fan controller 12 also is responsible for control of additional features such as anti-condensation, blade rotation sensing, lamp circuit integrity check, lamp bulb life extension, quick speed change and silent motor operation. These features will be described in further detail presently.

The wall switch 16 communicates with fan controller 12 by a communication link 20 in the form of the 2-wire a.c. power lines. In particular, as shown in FIGS. 1A and 1B link 20 comprises the a.c. power line which supplies power to the fan motor and lamp 24. The format of the communication is asynchronous and the direction of data flow is always from wall switch 16 to fan controller 12, i.e., simplex communication. The format of the information packet sent to the fan controller 12 is capable of carrying enough data to allow fan controller 12 to determine the address of the fan to be controlled, the control command itself, and an error detection checksum.

In the system shown, each fan controller 12 is identified by a single digit address. This requires wall switch 16 to be capable of sending a single digit address and the ceiling fan control command with each message that is communicated to fan controller 12. The response of fan controller 12 to a wall switch command will be determined by the address of the fan controller as compared to the address sent by wall switch 16. The fan controller 12 responds to a wall switch command provided that the address sent by the wall switch 16 either matches the address of the fan controller exactly, equals "A" which is considered a universal address, or equals "M" which is considered a universal address for the pre-programmed fan settings which will be described.

As previously mentioned, fan controller 12 is responsible for a number of additional features. One is an anti-condensation feature wherein the fan controller is responsible for providing adequate heat to the fan motor bearings in order to maintain the temperature of the bearings a few degrees above ambient. In particular, the bearings are the element of an electric motor which are most prone to failure. In better motors, the bearings are made of high quality steel, are permanently lubricated and are partially sealed to provide maximum useful life. However, in very humid conditions condensation can occur on the bearings which, over a period of time, may cause sufficient oxidation of the surfaces to impede the bearing action and result in noisy operation or seizing. The present invention provides a unique feature to prevent condensation on the bearings: an electrically operated heater strip around the motor applies enough continuous heat to keep the temperature of the bearings above the dew point under most conditions, thus preventing condensation from occurring on the bearings and reducing the likelihood of rusting. Thus, the useful life of a fan in the system of the present invention should far exceed that of other fans in high humidity conditions. The electrically operated heater strip is disabled when the system power switch is turned off.

A second feature is automatic power shut off when the fan blades are not rotating. A blade rotation sensor is provided to sense blade rotation during fan operation, and power to the fan is shut off automatically if the fan motor power is on but the baldes are not rotating. In particular, ceiling fan motors are impedance-protected, which prevents extreme overheating of the motor and so provides protection against a possible power hazard. However, if an obstruction were to stop the fan blades from rotating while power is on, the motor can overheat the insulating materials enough to create a very offensive and potentially toxic odor. The system of the present invention prevents this possibility with a built-in motion sensor that detects blade rotation. If a condition ever is encountered when the fan motor power is on but the fan blades are not rotating, the power will be shut off automatically.

A third feature is lamp circuit integrity check whereby the lamp circuit is constantly monitored while power to the lamp is applied. If the lamp circuit has power on and the circuit is open due to bulb burnout, breakage, other damage or some form of electrical failure, then power to the lamp is automatically shut off. This will prevent electrical shock to anyone removing the defective bulb or otherwise torching the circuit. If the circuit operates more than one bulb, the safety circuit will detect a defect only if all the bulbs are out or the circuit is otherwise open. However, a person will know that power is on since the remaining bulbs will be lighted.

A fourth feature is a method for extending the useful life of bulbs utilized in the apparatus. In those installations where lamps on fans are not readily accessible for changing burnt out bulbs, the system of the present invention is particularly useful. It significantly extends the useful life of bulbs without reducing their light intensity. The principal cause of bulb failure is the rapid heating of the filament when the lamp is turned on, resulting in filament deterioration. The present invention sharply reduces this deterioration by providing a controlled turn-on of the lamp, allowing the filament to heat up gradually and thus eliminating the rapid temperature increase it would otherwise be subject to. In particular, the fan controller provides a "slow start" or ramping voltage to the lamp when power is applied and this eliminates the thermal shock associated with bulb burn-out.

A fifth feature is a quick speed change provided by the fan controller when the fan is turned on or the fan speed is changed which brings the fan blade rotation quickly to the desired speed. In particular, when a fan motor is turned on or when the speed selection is increased, the system of the present invention applies a short surge of power to bring the blade rotation quickly up to the desired speed. Similarly, when the speed is decreased or the motor is turned off, the motor is reversed briefly to slow or stop the blades quickly. Thus, with the system of the present invention, the user does not have to wait for an extended period of time to determine if the speed selected will be satisfactory of if a further adjustment is needed.

A sixth feature is silent motor operation. Fan speed controls employ either an attenuation technique or pulse width modulation to achieve speed changes. The latter technology is inherently noisy in operation but is inexpensive to build and therefor is used with lower-priced fans. Some prior art systems claim to be quiet because of a "choke" added to the pulse width modulation circuit; however, the "choke" does very little to reduce the inherent noise level of a pulse width modulation speed control. Attenuation is the only proven technique at the present time which will provide quiet speed control of a fan, and it is implemented with capacitive or resistive networks. The fan controller of the present invention uses a resistive network for fan speed control, and this attenuation technique provides quiet fan speed control.

The wall switch 16 and fan controller 12 in the system 10 of the present invention operate in a co-operative manner to provide clear and simple control for ceiling fan 14 and lamp 24 in a manner not requiring the user to be familiar with system 10 prior to using it.

Figure 2:
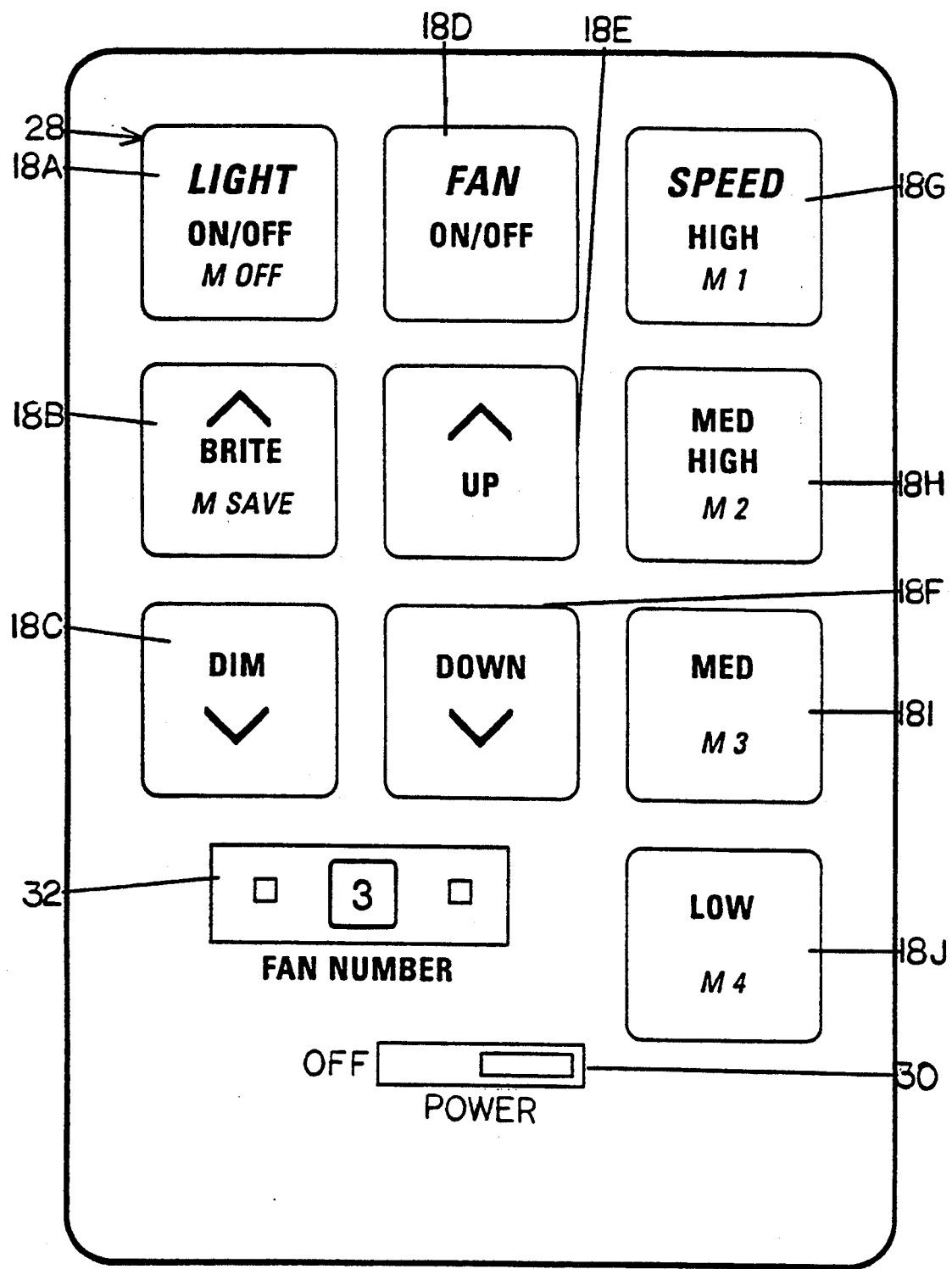
FIG. 2 is a diagrammatic view of a portion of the wall switch in the addressable version of the system.
Figure 3:
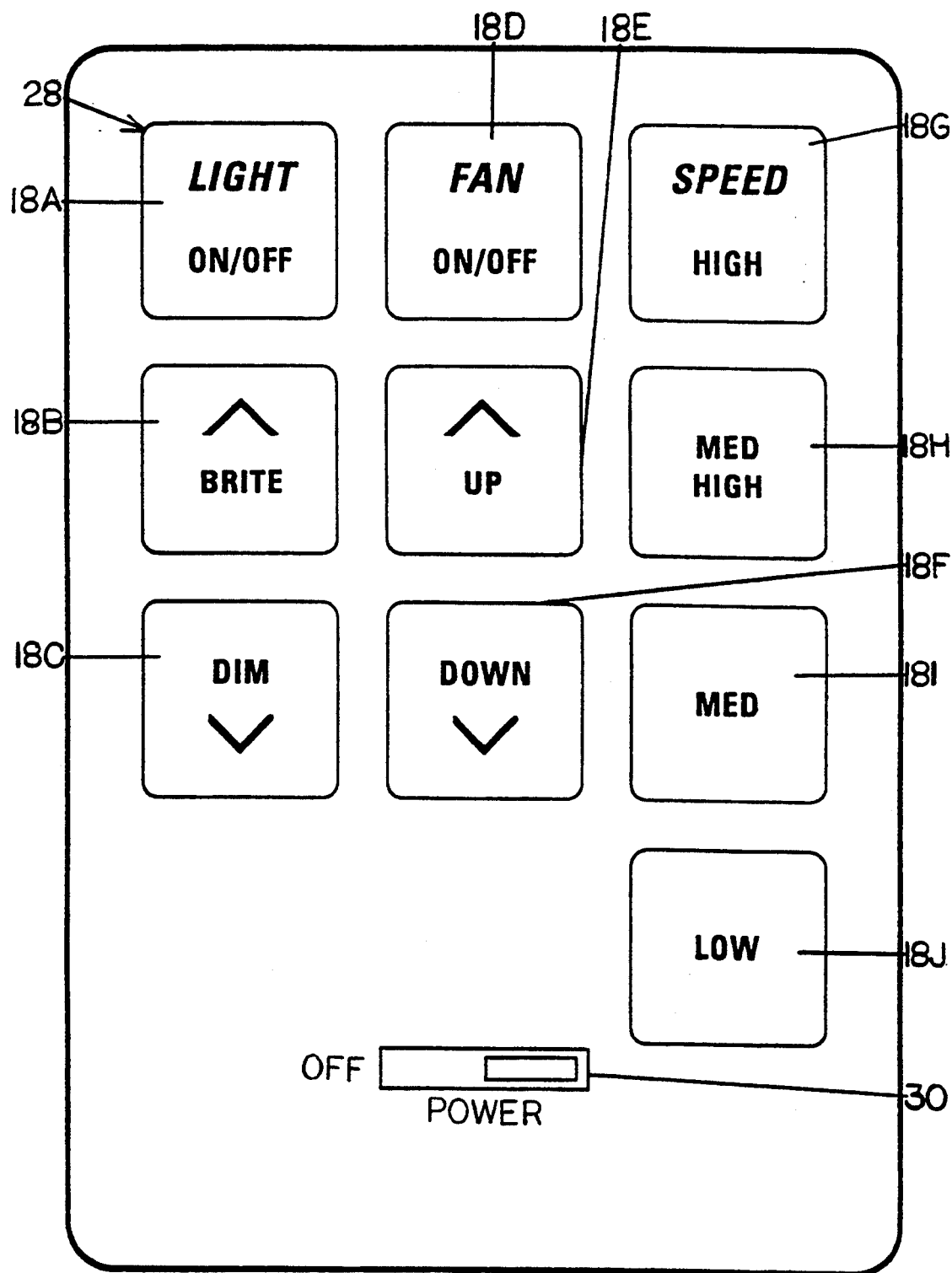
FIG. 3 is a diagrammatic view of a portion of the wall switch in the non-addressable version of the system.

The wall switch 16 includes a single ten key keypad 28 whereby the activation of any key represents a distinct control command to the fan controller 12. The keys of keypad 28 are the operator members 18 previously described. The wall switch 16 also contains an ON/OFF switch 30 mounted below the keypad to interrupt line power to the appliance. The addressable version of wall switch 16 also contains a single pushwheel switch 32 for entering the address of the fan to be controlled. Layouts of the wall switch front panel for the addressable and non-addressable versions are shown in FIGS. 2 and 3, respectively. There are 10 individual keys 18a–18j on the wall switch 16 that represent 18 individual fan control commands. A fan control command is sent by either momentarily pressing and releasing an individual key 18, as in the case of the fan speed control keys, or by continuously pressing and holding an individual key 18, as in the case of the light intensity control keys. In addition, secondary functions are activated by either selecting certain positions of the address pushwheel 32 or by depressing multiple keys simultaneously. These keys and their associated functions are given in Table II.

TABLE II

| Key | Pushwheel Setting* | Associated Fan Control Command |
|---|---|---|
| Light ON/OFF | 'A', 1-8 | Toggles the light ON and OFF |
|  | 'M' | All fans and lights off |
| Brite | 'A', 1-8 | Increases the brightness of the light |
|  | 'M' | Memory Save in conjunction with M1, M2, M3 or M4 |
| Dim | 'A', 1-8 | Decreases the brightness of the light |
|  | 'M' | No function |
| Fan OFF/On | 'A", 1-8 | Toggles the fan ON and OFF |
|  | 'M' | No function |
| Up | 'A', 1-8 | Sets the direction of the fan air flow to be up |

<small>Wall Switch Key Definition</small>

TABLE II-continued

| Key | Pushwheel Setting* | Associated Fan Control Command |
|---|---|---|
| Down | 'M' | No function |
| | 'A', 1-8 | Sets the direction of the fan air flow to be down |
| High | 'M' | No function |
| | 'A', 1-8 | Selects the 'HIGH' operating speed for the fan |
| | 'M' | Memory Recall #1-user defined configuration |
| Med High | 'A', 1-8 | Selects the 'MED HIGH' operating speed for the fan |
| | 'M' | Memory Recall #2-user defined configuration |
| Med | 'A', 1-8 | Selects the 'MED' operating speed for the fan |
| | 'M' | Memory Recall #3-user defined configuration |
| Low | 'A', 1-8 | Selects the 'LOW' operating speed for the fan |
| | 'M' | Memory Recall #4-user defined configuration |
| Up & Down | 'A', 1-8 | Diagnostics Mode |
| Low & Med | 'M" | Change Fan Controller ID |

*Only for addressable Wall Switch

The address of the fan controller to be communicated with is entered using the pushwheel switch 32 mounted in wall switch 16. This switch represents the address for the fan controller as will be described. As noted above, the non-addressable system employs no pushwheel switch.

The LIGHT On/Off key 18a serves two functions depending on the selection of the pushwheel switch 32. With the pushwheel set in the 'A' or '1-8' positions the key 18a turns the addressed light group(s) on or off. When turned on, the light intensity will be whichever intensity setting was last selected, regardless whether the lights were on or off. With the pushwheel 32 in the "M" (Multi-Memory) position the key 18a turns off all fans and lights.

The BRITE key 18b serves two functions depending on the selection of the pushwheel switch 32. When the pushwheel is in position 'A' or '1-8' the BRITE key increases the brightness of the light until the key is released or the maximum intensity is reached. The BRITE key 18b will perform this function whether the light(s) are on or off and will maintain the new setting until changed. In the "M" (Multi-Memory) mode the BRITE key is used in conjunction with the fan speed keys to program the user defined configurations. These keys are held simultaneously for 3 seconds to program the current system configuration.

The DIM key 18c decreases the brightness of the lights until the key is released or the minimum intensity is reached. The DIM key will perform this function whether the light(s) are on or off and the lights will maintain this new setting until changed. This key serves no function for the pushwheel setting 'M'.

The FAN ON/OFF key 18d turns the fan(s) that are currently addressed, on or off. When turned on, the fan speed and direction will be whichever fan setting was last selected for those fans, regardless whether the fan was on or off. This key serves no function for the pushwheel setting 'M'.

The UP key 18c serves two functions with the pushwheel 32 set in the 'A' or '1-8' position. When momentarily depressed, the UP key selects the direction of the fan(s) addressed, to force the air upward. The direction is selected whether the fan is running or not. In addition, for the same pushwheel settings, if the UP key is depressed simultaneously with the DOWN key 18f for three seconds, the wall switch goes into the diagnostics mode. This key serves no function for the pushwheel setting 'M'.

The DOWN key 18f serves two functions with the pushwheel 32 set in the 'A' or '1-8' positions. When momentarily depressed, the DOWN key selects the direction of the fan(s) addressed, to force the air downward. The direction is selected whether the fan is running or not. In addition, for the same pushwheel setting, if the DOWN key is depressed simultaneously with the UP key 18e, for three seconds, the wall switch goes into the diagnostic mode. This key serves no function for the pushwheel setting 'M'.

The HIGH speed key 18g serves two functions depending on the setting of the pushwheel switch 32. With the pushwheel in the 'A' or '1-8'positions the HIGH speed key selects the HIGH fan speed for those fans addressed. The setting is updated whether the fan is current on or off. With a pushwheel setting of 'M' (Multi-Memory) the HIGH speed key 18g addresses fan controller memory location #1. If the HIGH speed key is pushed simultaneously with the BRITE key 18b for 3 seconds the fan controller 12 stores its current operating configuration into its memory location #1. If the HIGH speed key is depressed momentarily by itself the fan controller sets the fan and light(s) to the configuration previously stored in the Fan Controller memory location #1.

The MED HIGH speed key 18h serves three functions depending on the setting of the pushwheel switch 32. With the pushwheel in the 'A' or '1-8' positions the MED HIGH speed key selects the MED HIGH fan speed for those fans addressed. The setting is updated whether the fan is currently on or off. With a pushwheel setting of 'M' (Multi-Memory) the MED HIGH speed key addresses fan controller memory location #2. IF the MED HIGH speed key is pushed simultaneously with the BRITE key 18b for 3 seconds the fan controller 12 stores its current operating configuration into Fan Controller memory location #2. If the MED HIGH speed key is depressed momentarily by itself the fan controller sets the fan and light(s) to the configuration previously stored in the Fan Controller memory location #2.

The MED speed key 18i serves four functions depending on the setting of the pushwheel switch 32. With the pushwheel in the "A" or '1-8' positions the MED speed key selects the MED fan speed for those fans addressed. The setting is updated whether the fan is currently on or off. With a pushwheel setting of 'M' (Multi-Memory) the MED speed key 18i addresses fan controller memory location #3. If the MED speed key is pushed simultaneously with the BRITE key 18b for 3 seconds the fan controller stores its current operating configuration into fan controller memory location #3. If the MED speed key is depressed momentarily by itself the fan controller 12 sets the fan and light(s) to the configuration previously stored in memory location #3. In addition, for the pushwheel setting 'M' (Multi-Memory), if the MED key 18i depressed simultaneously with the LOW key 18j for three (3) seconds, the wall switch sends a command to the fan controllers to await a possible address change. After the fans are alerted of a possible address change, the user selects the address with the pushwheel switch 32. The fan controller awaits for optical simulation to reprogram the current fan controller address to the address now currently displayed in the pushwheel switch. The reprogramming of the addresses will be discussed in greater detail presently.

The LOW speed key 18j serves four functions depending on the setting of the pushwheel switch 32. With the pushwheel in the 'A' or '1-8' positions the LOW speed key selects the LOW fan speed for those fans addressed. The setting is updated whether the fan is currently on or off. With a pushwheel setting of "M" (Multi-Memory) the LOW speed key addresses fan controller memory location #4. If the LOW speed key is pushed simultaneously with the BRITE key 18b for 3 seconds the fan controller 12 stores its current operating configuration into fan controller memory location #4. If the speed key is depressed momentarily by itself the fan controller sets the fan and light(s) to the configuration previously stored in memory location #4. In addition, for the pushwheel setting 'M' (Multi-Memory), if the LOW key 18j is depressed simultaneously with the MED key 18i for three (3) seconds, the wall switch sends a command to the fan controllers to await a possible address change. After the fans are alerted of a possible address change, the user selects the new address with the pushwheel switch. The fan controller awaits for optical stimulation to reprogram the current fan controller address to the address now currently displayed in the pushwheel switch. The reprogramming of the addresses will be discussed in greater detail presently.

The wall switch 16 contains a built in diagnostic procedure that is automatically executed once invoked by the user. The user can invoke the diagnostics by simultaneously pressing and holding the UP 18e and DOWN 18f keys for a period of 3 seconds. The purpose of the diagnostic is to verify proper operation of the system. The diagnostics use every available fan controller command during the diagnostics test. Should the diagnostic function properly but the operator is unable to obtain proper operation manually, then there is a reasonable certainty that the wall switch is the failing link in the system.

A fan controller address change is initiated using the MED and LOW keys 18i and 18j respectively. In particular, for the pushwheel 32 setting "M" (Multi-Memory), if the LOW key 18i is depressed simultaneously with the MED key 18j for three seconds, the wall switch 16 sends a command to the fan controllers to await a possible address change. After the fans are alerted of a possible address change, the user selects the new address with the pushwheel switch 32. The fan controller 12 awaits for optical stimulation to reprogram the current fan controller address to the address now currently displayed in the pushwheel switch. The reprogramming of the addresses will be discussed in greater detail presently.

The pushwheel switch 32 is used to select fan controller addresses and to place the system into certain operating modes. The address of the fan controller to be communicated with is entered by using the pushwheel switch. The switch setting represents the address for the fan controller as will be described. The settings 1-8 address only those fans with the same address whereas a setting of 'A' addresses all the fans. The non-addressable system employs no pushwheel switch.

Setting the pushwheel switch 32 to 'M' (Multi-Memory) selects the multi-memory function of the wall switch 16. When in this setting the wall switch issues various commands based on the keypad inputs of the switch. The commands consists of memory recall of user pre-defined configurations, storing of new configurations, fan controller ID change and an all 'OFF' condition for all fans and lights. If any speed key is depressed momentarily by itself, the fan controller 12 sets the fan and light(s) into the state stored in the memory location associated with the key. If the BRITE key 18b is pushed simultaneously with any of the speed keys for three seconds the fan controller 12 stores its current operating configuration into the fan controller memory location associated with that key. If the LOW key 18j is depressed simultaneously with the MED key 18i for three seconds, the wall switch 16 sends a command to the fan controllers to await a possible address change. After the fans are alerted of a possible address change, the user selects the new address with the pushwheel switch 32. The fan controller 12 awaits for optical stimulation to reprogram the current fan controller address to the address now currently displayed into the pushwheel switch 32. The reprogramming of the addresses will be discussed in greater detail presently. With the pushwheel 32 in the 'M' (Multi-Memory) position the Lights ON/OFF key 18a turns off all fans and lights.

The ON/OFF power switch 30 interrupts line power to the wall switch 16. When the power switch is turned off the current light and fan settings are lost and are replaced with an all "off" condition. The four user pre-programmed multi-memory settings are, however, preserved and are available upon re-applying power.

The fan controller 12 is in the form of a small electronic assembly mounted internal to the ceiling fan 14. The only interaction between the user and the fan controller 12 occurs in setting the fan controller address at the time of installation or at a later date should a change of address be required. Each fan controller is identified by an address in the range of 1 through 8. The selection of the address for the fan controller is described hereinbelow. As previously mentioned, the address of "0" shall be interpreted by all of the fan controllers as a matching address. Therefore, conceptually it would not be expected that an individual fan be configured with this address; however this mode is acceptable if so desired.

The changing of the fan controller address is initiated by placing the system into the address changing mode. This is done at the wall switch 16 by selecting the 'M' (Multi-Memory) setting on the pushwheel 32 and holding the LOW 18j and MED 18i keys simultaneously for three seconds. The user then sets the pushwheel to the new desired address. Each fan controller 12 is now awaiting an optical input.

The approach for changing the address of the fan controller 12 uses a light source. This approach is particularly useful if the fan is out of reach. The fan controller 12 has an optical sensor on the controller board to sense a beam of light impinging upon it. If the fan controller 12 senses this light while in the 'change address mode', the fan controller 12 will read the current address of the next command word sent and store it as its own ID number.

The control of the motor speed is performed by each fan controller 12 in a manner which minimizes the acoustic output of the motor as will be described in detail presently. Each fan controller 12 controls the anti-condensation feature of the fan independent of the wall switch 16. The fan controller maintains about a 6 watt thermal dissipation on the motor. This heat is enough to raise the temperatures of the bearings 6° F. above ambient. In most cases this is adequate to maintain the bearing temperature high enough to prevent condensation from forming on the bearings thus impeding the formation of rust. This feature is on at all times except when the main ON/OFF power switch is turned off. The manner in which this feature is implemented will be described in detail presently. The function of the blade rotation sensor in each fan controller 12 is to detected the rotation of the blades while the fan is on. If no rotation is detected for 10 seconds the fan controller 12 shuts the fan off. The fan rotation system is also used for changing the fan controller ID number. Both of these features will be described in detail presently.

Each fan controller 12 continually checks the light circuit to verify electrical integrity. If the circuit is interrupted, i.e. all bulbs burned out or removed, the power to the circuit is disconnected. Each fan controller 12 also controls the light bulb extended life feature. Upon receiving a "light on" command the fan controller ramps the power up to the desired light intensity. The maximum time to reach full intensity is 2.2 seconds. This ramping is sufficient tof reducing the sudden thermal and electrical impact detrimental to long light bulb life. Each fan controller 12 employs three LED's to convey to the user a reasonable level of system integrity. The three LED's are each a different color indicating a different functional check. The first LED is red and indicates to the user that the necessary voltage exits to operate the microcontroller of the fan controller. Essentially this is an indication that AC power has been applied and that some of the circuitry on the fan controller is operative. The second LED is green and continuously flashes ON and OFF at about a 1 Hz rate. This is an indication that the microprocessor of the fan controller is cycling and appears to be fully operative. The third LED is yellow and only comes on when a command from the wall switch 16 is received. This indicates that the a.c. line has been wired up with proper polarity to the fan controller. Since the duration of a single command is somewhat short, it may be difficult to see the LED flash. Therefore, a continuously scanned key such as the light intensity keys may be pressed and held while observing the yellow LED. In this case, the LED may appear to be dimmer than in the case of the single pressing of the key.

The implementation and operation of wall switch 16 and fan controller 12 now will be described in detail. Wall switch 16 communicates with fan controller 12 over the existing AC power lines. The communication method uses a pulse code modulation technique (PCM) through phase control on the negative excursion of the AC cycle. Therefore, when the wall switch 16 wishes to communicate with fan controller 12, it places a 17 bit data message onto the AC line. The data message that is placed on the AC line is done so by interrupting the negative excursion of the AC cycle for a short interval of approximately 45 degrees to represent a logic "0" or passing the AC cycle uninterrupted to represent a logic "1". A start bit interrupts the entire negative excursion of the AC cycle. The 17 bit data word format is given in Table III and a system level timing diagram is provided in FIG. 4.

TABLE III

| Bit Position | Label | Function |
| --- | --- | --- |
| 17I(MSB) | START | An active low bit indicating the start of message |
| 16 | CKBIT3 | The msb of a 4 bit checksum |
| 15 | CKBIT2 | Checksum bit 2 |
| 14 | CKBIT1 | Checksum bit 1 |
| 13 | CKBIT0 | Checksum bit 0 |
| 12 | ADR3 | The msb of a 4 bit ID used to address the Fan Controller |
| 11 | ADR2 | Address bit 2 |
| 10 | ADR1 | Address bit 1 |
| 09 | ADR0 | Address bit 0 (lsb) |
| 08 | DATA6 | The msb of a 7 bit data/command word |
| 07 | DATA5 | Data bit 5 |
| 06 | DATA4 | Data bit 4 |
| 05 | DATA3 | Data bit 3 |
| 04 | DATA2 | Data bit 2 |
| 03 | DATA1 | Data bit 1 |
| 02 | DATA0 | Data bit 0 (lsb) |
| 01 | STOP | An active high bit indicating the end of message |

Figure 4:
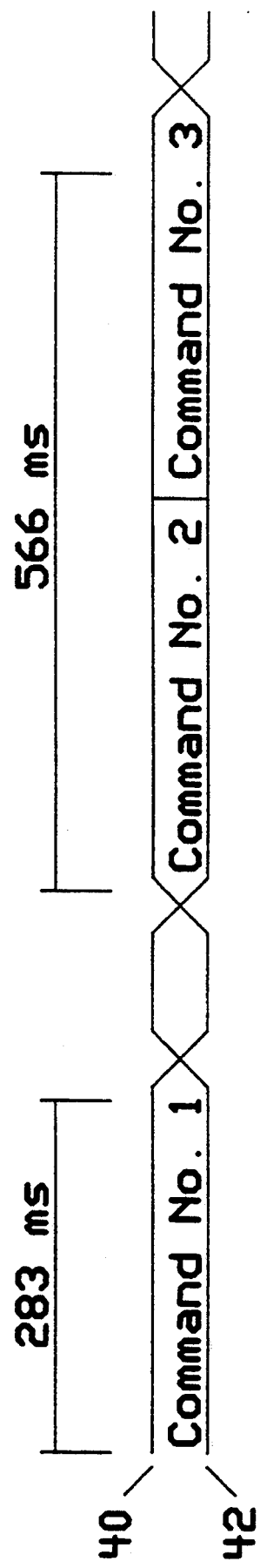
FIG. 4 is a graph including waveforms illustrating the method of the present invention.
Figure 4:
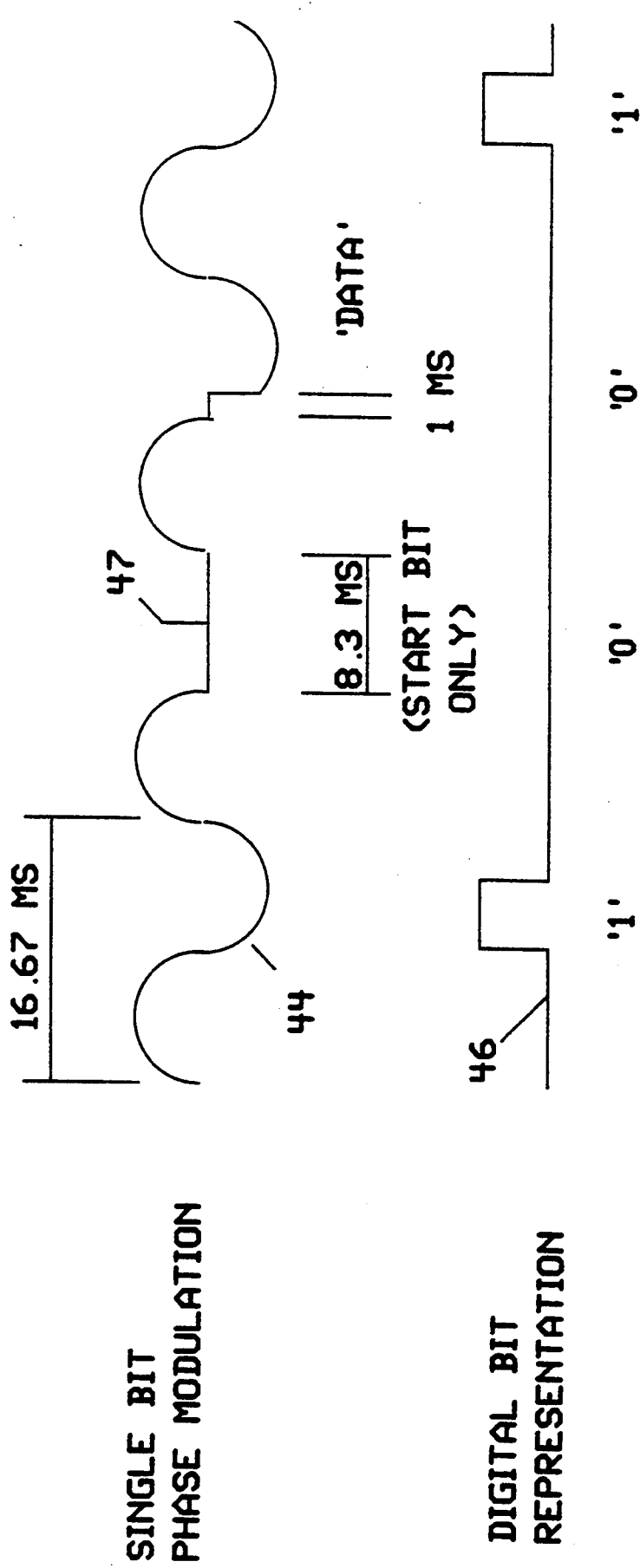

In FIG. 4, waveforms 40, 42 illustrate a multiple command string, waveform 44 illustrates single bit phase modulation and waveform 46 presents a digital bit representation according to the method of the present invention. The duration of the start bit is indicated on the portion 47 of waveform 44. The speed of the fan motor is controlled by attenuating the AC line voltage to the motor. This technique has been selected for the sole purpose of minimizing the amount of audible humming that the motor exhibits when subject to other means of speed control. The AC line voltage is attenuated using resistors in series with the motor. There are four discrete speeds that are able to be selected depending on the value of the resistance that is placed in series with the motor. In addition, alternative pulse code modulations can be employed, such as interrupting the positive excursions of the AC cycle.

The intensity of the light emitted by lamp 24 attached to ceiling fan 14 is controlled using pulse width modulation. This technique is widely used as a means for brightness control, and it includes simply delaying the fiting of a TRIAC which drives the AC voltage to the lamp light. Varying the delay to the TRIAC will vary the amount of energy delivered to the lamp which causes the brightness of the light to vary.

The function of wall switch 16 is to continuously scan keypad 28 to determine if a key 18 has been pressed by the user and upon detection of a depressed key, send the appropriate information over the communication link 20 to the fan controller 12. There is essentially no difference between the addressable and non-addressable versions of wall switch 16 other than the actual pushwheel switch 32 used to input the address to the wall switch 16. In the case of the addressable wall switch, the pushwheel switch 32 is configured as part of the keypad 28 itself as shown in FIG. 2.

Figure 5:
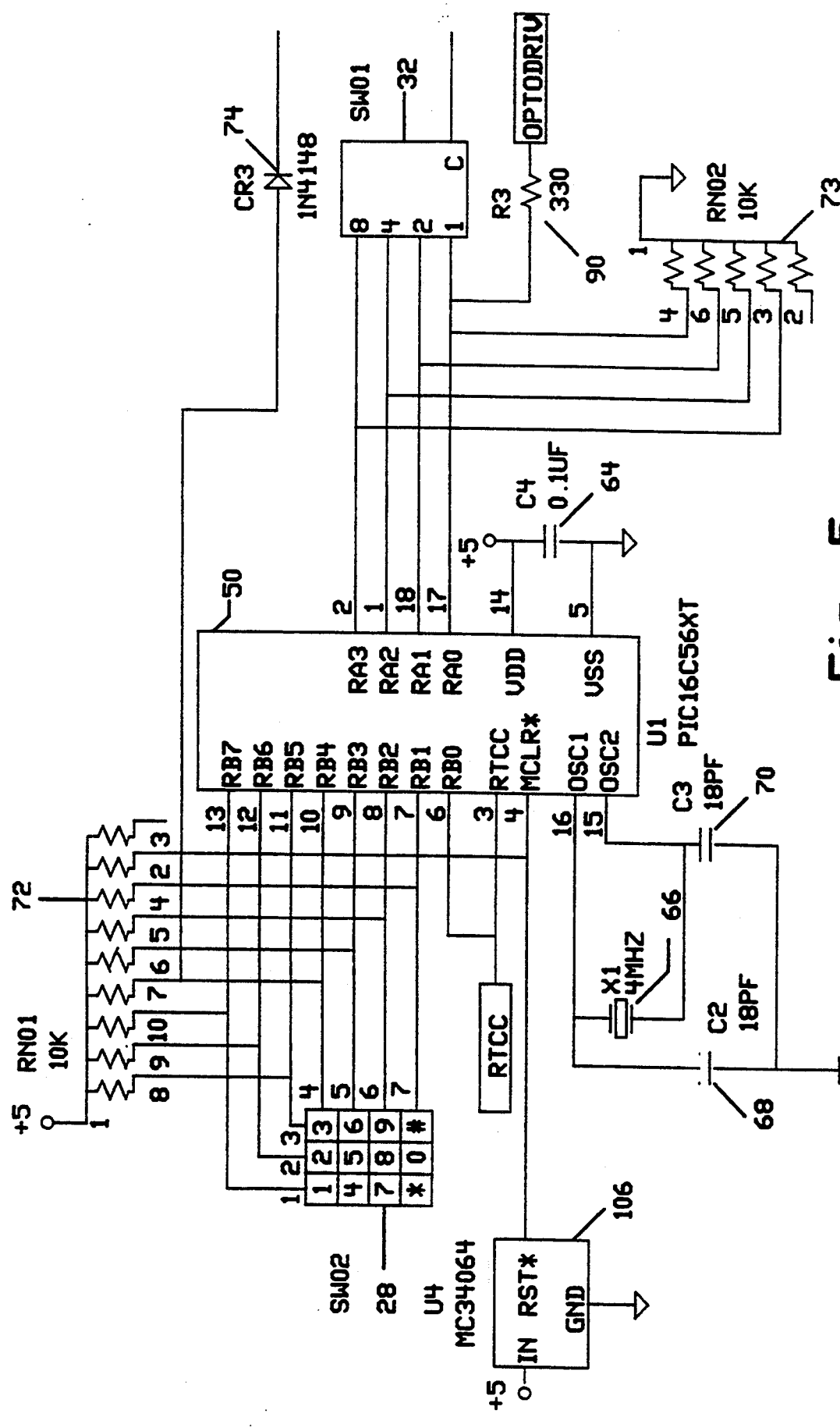
FIG. 5 is a schematic diagram of the implementation of the wall switch in the system of the present invention.
Figure 5:
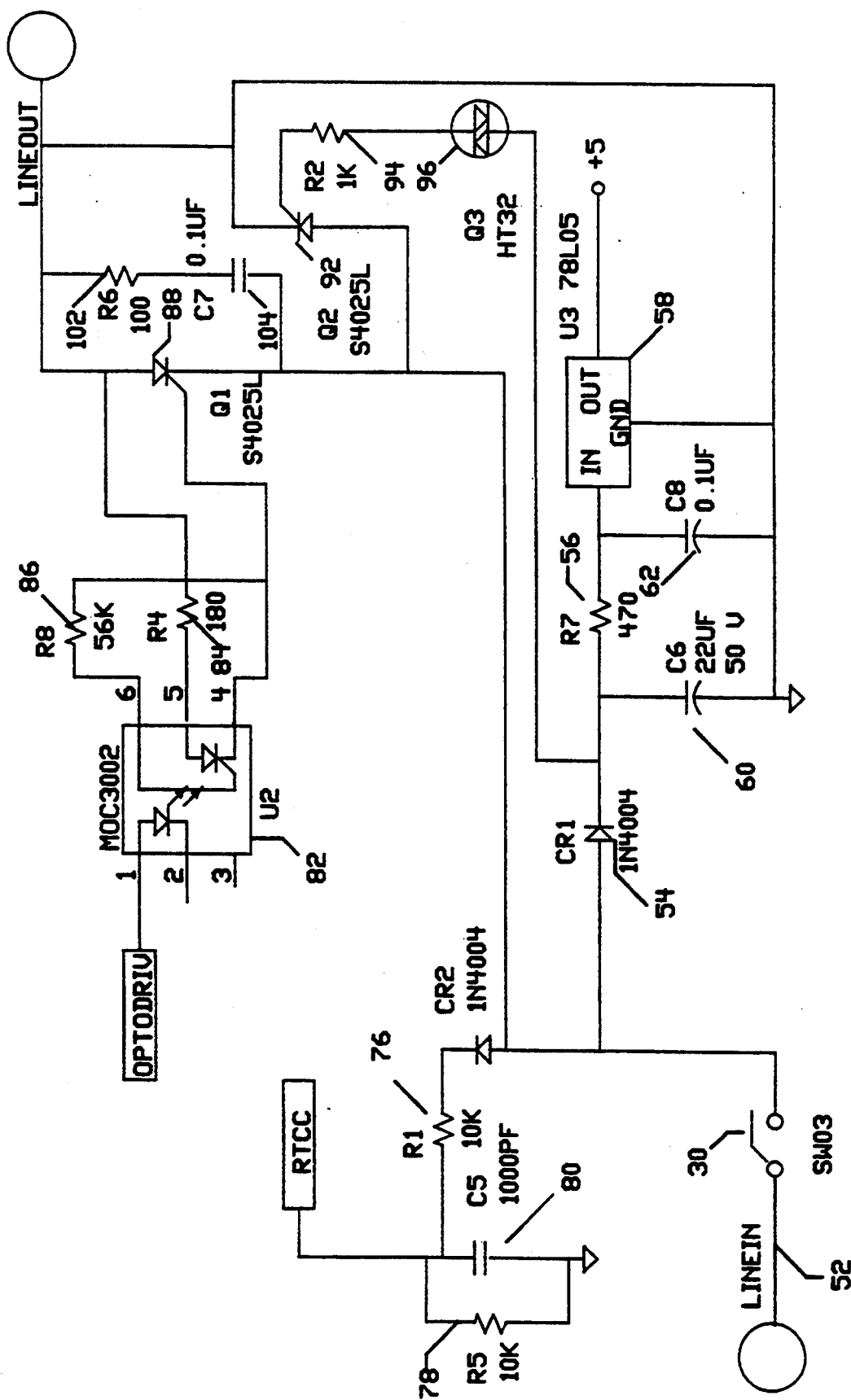

The wall switch subassembly 16 is centered around an 8-bit microcontroller designated 50 in FIG. 5 and which is responsible for executing the software which will be described. By way of example, in an illustrative system, microcontroller 50 is a Microchip PIC16C56. A 5 VDC power supply is generated from the AC line 52 using rectifying diode 54, current limit resistor 56, voltage regulator 58, smoothing capacitor 60 and input decoupling capacitor 62. This 5 VDC is used to power the microcontroller 50 and is decoupled through capacitor 64. The microcontroller 50 operates at a 4 MHZ clock frequency as defined by crystal oscillator 66 and capacitors 68 and 70. The 3×4 keypad 28 with matrix wiring output is configured to Port B of microcontroller 50. The microcontroller scans the keypad by individually driving a row to a low state (0 volts DC) and then reading the state of each of the individual columns. Resistor network 72 is responsible for pulling the inactive columns up to a logic one, i.e. 5 VDC, state. In the case of the addressable wall switch 16, the address is driven by switch 30 and read on Port A of microcontroller 50. Resistor network 72 is responsible for pulling down the undriven lines of switch 32. Switch 32 is omitted in the non-addressable wall switch. Diode 74 allows bit 4 of Port B to supply a logic high to switch 32.

The AC waveform is current limited and filtered by means of resistors 76 and 78 and capacitor 80. The resultant signal is then applied to the RTCC pin and bit 0 of Port B of microcontroller 50 to synchronize with the AC line voltage in order to properly communicate with the fan controller 12. Bit 0 of Port A is responsible for switching the negative half of the AC waveform to the fan controller via optoisolator 82, resistors 84 and 86, and SCR 88. The current through the optoisolator is limited by resistor 90. Current to the gate of the optoisolator SCR is limited by resistor 86. Current to the gate of SCR 88 is limited using resistor 84. The positive half of the AC waveform is controlled by SCR 92, resistor 94 and Diac 96. When the positive excursion of the AC cycle reaches approximately 32 volts, Diac 96 conducts and turns on SCR 92 through current limit resistor 94 connected to the gate, allowing the rest of the positive AC cycle to pass. Diac 96 also allows enough charge to accumulate on capacitor 60 to keep voltage regulator 58 in regulation during negative excursions of the AC cycle. Resistor 102 and capacitor 104 are used as a snubber circuit for SCR 88 to prevent false triggering when driving inductive loads such as the fan motors. Upon the application of power, a device reset occurs on pin 4 of microcontroller 50. This reset is generated by under voltage sensor 106 and resistor network 72.

Figure 6:
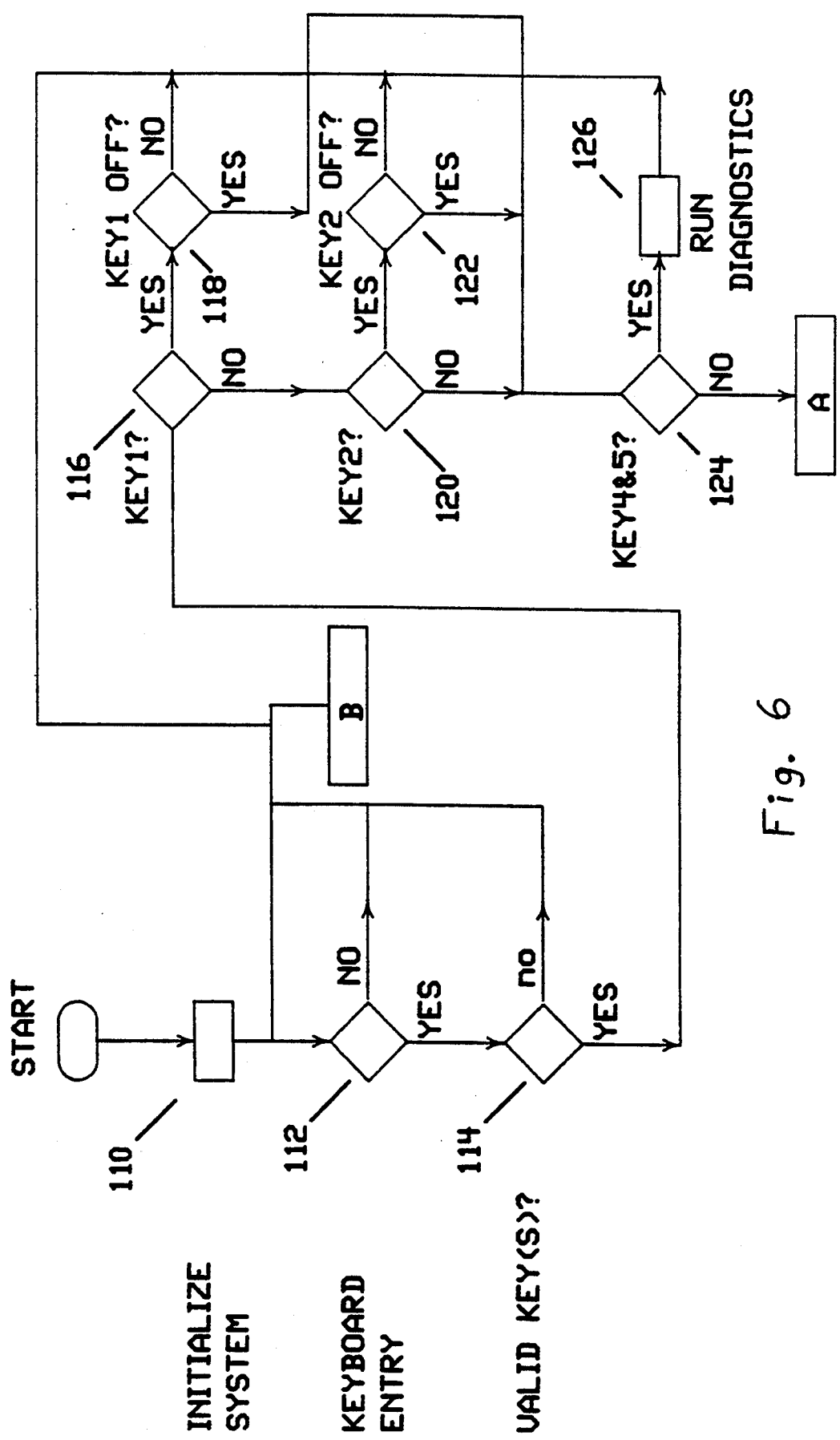
FIG. 6 is a program flow chart illustrating operation of the switch of FIG. 5.
Figure 6:
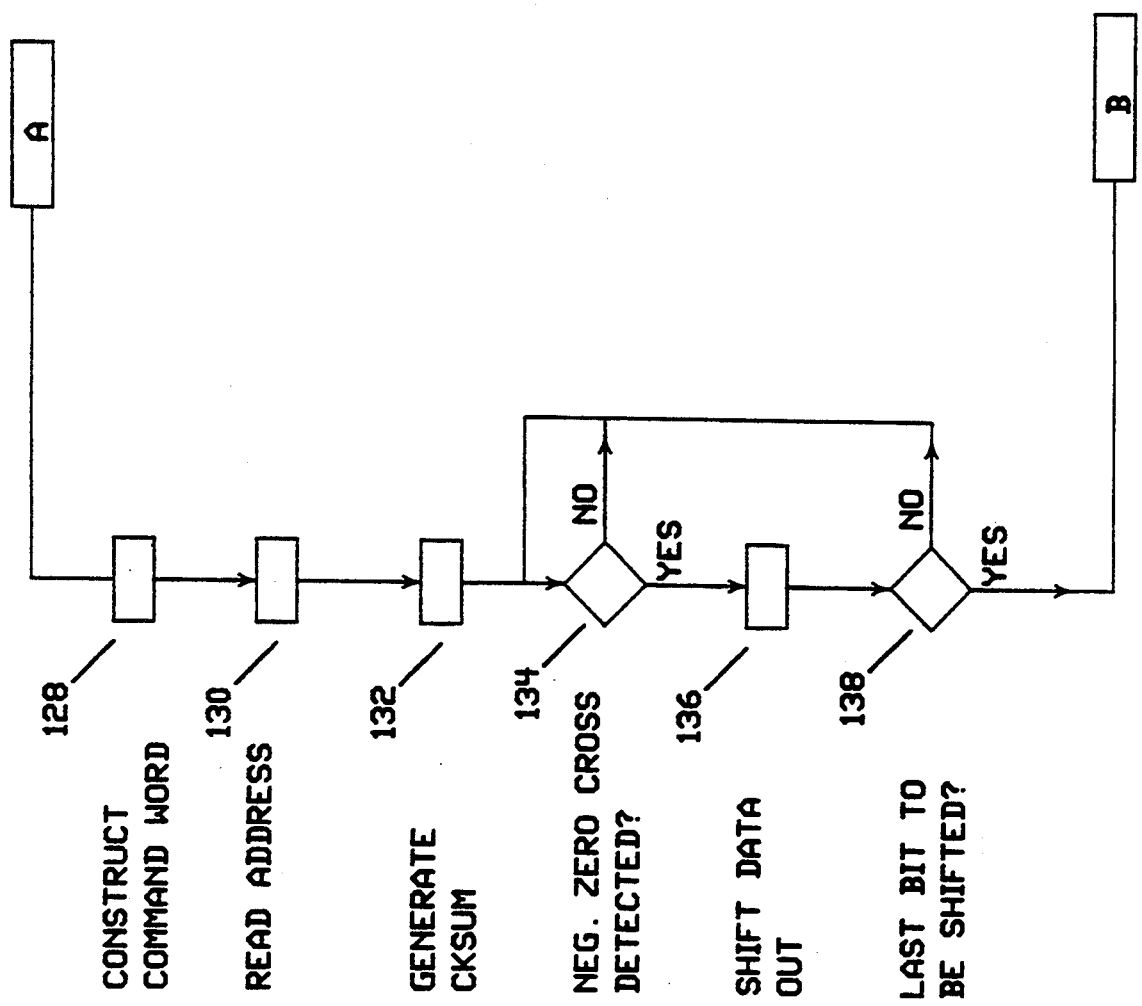

The wall switch software is written in the assembly language of the 16C56 microcontroller 50 and is identical for either the addressable or non-addressable versions of the wall switch 16. A flow chart depicting the logic of the software is given in FIG. 6 and a description of each of the major functional blocks is as follows.

| | |
|---|---|
| Initialize System (110) | All system variables are initialized to a default value. |
| Keyboard Entry? (112) | The software scans the keypad to determine if a valid entry has occurred. This is done by driving a logic "0" out to a ROW of a keypad and scanning the individual COLUMNS of the keypad for a response. This is repeated for each ROW of the keypad to determine if a key has been pressed. |
| Valid Key? (114) | Once a key has been detected, it is resampled after a 200 millisecond delay to provide filtering against spurious noise on the input and/or grounds lines and thus prevent fals transmissions to the Fan Controller from occurring. |
| Key 1? (116) | Key 1 functionally represents the Light ON/OFF key and is prevented from being held down continuously and thereby repeatedly turning the light on and off. Therefore, should this key be detected, a special check to see if it has been continuously held down is performed. If so, no action is taken. If not, the state of the light is simply toggled. |
| Key 1 Off? (118) | This is the check to see if key 1 was previously pressed (on) or not (off). |
| Key 2? (120) | Key 2 functionally represents the Fan ON/OFF key and is prevented from being held down continuously and thereby repeatedly turning the fan on and off. Therefore, should this key be detected, a special check to see if it has been continuously held down is performed. If so, no action is taken. If not, the state of the fan is simply toggled. |
| Key 2 OFF? (122) | This is the check to see if Key 2 was previously pressed (on) or not (off). |
| Key 5 & 8? (124) | A special diagnostic routine is invoked if keys 5 and 8 (Winter and Summer respectively) are pressed simultaneously. |
| Run Diagnostics (126) | This is the diagnostic routine that is automatically sent out to the Fan Controller upon the detection of keys 5 and 8 simultaneously being pressed. |
| Construct Command Word (128) | Once a key has been pressed, the unique command corresponding to that particular key is formatted and stored in memory in preparation to be sent out to the Fan Controller. |
| Read Address (130) | A single pushwheel switch is used to indicate the address of the Fan Controller. The pushwheel switch is read every time prior to sending the 17 bit word transmission to the Fan Controller. |
| M Mode? (132) | This is a check to see if the pushwheel switch is set to memory mode (address 9). |
| Modify Command Word (134) | When the pushwheel switch is set to memory mode (address 9), the normal operational command words are replaced with memory command words. The modified command words allow access to memory functions. |
| Generate Cksum (136) | Once the DATA and ADDRESS portions of the 17 bit word have been constructed, a 4 bit checksum is genertd and appended as part of the overall 17 bits to be sent to the Fan Controller. This checksum is a simple binary addition over its 2-12. |
| Neg. Zero Crossing Detected? (138) | The software determines the point of zero crossing on the AC LINE voltage going from positive voltage to negative voltage. It is at this point in time that the data bit is then output onto the line. |
| Shift Data Out (140) | Once the negative zero corssing point has been detected, the next data bit of the 17 bit word is shifted out to the Fan Controller. |
| Last bit to be shifted? (142) | A check is performed to determine if all 17 bits have been shifted out to the Fan Controller. If not, the process continues. If so, control is transferred back to scanning the keypad for a new command. |

By way of example, in an illustrative system, oscillator 66 is type ECS40204, keypad 28 is a TBD membrane switch, switch 30 is an ARK-LES Series 20 SPDT on-off switch, switch 32 is a Cherry T59-13MA pushwheel switch, optoisolator 82 is Motorola MOC3023, voltage regulator 58 is National Semiconductor 78L05, component 106 is a Motorola MC 34064 undervoltage sensing circuit, network 72 is Panasonic EXB-F10E103G, network 73 is Panasonic EXB-F6E1036, SCRs 88 and 92 are Teccor S4025L and Diac 96 is Teccor HT32.

The function of the fan control 12 is to receive commands from the wall switch 16, interpret these commands, and drive the direction of the fan motor, the speed of the fan motor and the brightness of the lamp 24 correctly. Only one version of the fan controller 12 is required for either the addressable or non-addressable versions of the wall switch 16.

The fan controller subassembly 12 is centered around an 8-bit microcontroller designated 150 in FIG. 7 and which is responsible for executing the software which will be described. By way of example, in an illustrative system, microcontroller 150 is a Microchip P1C16C5478. A 5 V DC power supply is generated from the AC line 152 using an external voltage dropping and current limiting resistor 154, rectifying diode 156, voltage regulator 158, input decoupling capacitor 160 and smoothing capacitor 162. The 5 V DC in conjunction with current limit resistor 164 is used to light the red LED 166 thereby indicating local power has been established. This in turn causes a reset to the microcontroller 150 to occur after a time delay as defined by undervoltage sensor 168 and pull-up resistor network 170. Diode 172 allows current to flow through external resistors 154 during the negative half of the AC cycle.

The microcontroller operates 150 at a 4 Mhz clock frequency as defined by crystal oscillator 176 and capacitors 178 and 180. Phototransistor 184, resistors 186, 188, 190 and 192, resistive network 194, capacitors 196 and 198, and comparator 200 form a circuit to detect an intense beam of light from a flashlight. The circuit sets sensitivity, contains a 60 Hz filter, and outputs a logic 1 to bit 3 of Port C on the microcontroller 150 when the beam of light is detected. This signal is used to allow the address of the fan controller 12 to be changed from the wall switch 16.

A Hall Effect sensor 202 mounted on the fan motor, triggered by a magnet 204 on the flywheel, is connected at 206 to the fan controller 12. Diode 208, resistors 210 and 212 and capacitor 214 are used to convert the signal from the Hall Effect sensor 202. Capacitor 214 is periodically charged through resistor 210 by a short pulse from Bit 6 of Port C. When the magnet 204 passes over the sensor 202, its output drops low and discharges capacitor 214 through resistor 212. Diode 108 prevents the Hall Effect sensor 202 from charging capacitor 214 when its output is high. If the fan is not rotating, capacitor 214 does not discharge periodically and eventually charges to a logic 1 level from the microcontroller pulses. The microcontroller 150 periodically reads the logic level at Bit 6 of Port C to detect fan rotation.

The microcontroller 150 has the ability under software control to drive two additional LED's on, 220 and 222, through current limit resistors 224 and 226, respectively. The LEDs are for diagnostic purposes only. The RTCC register of microcontroller 150 is clocked externally using the AC line voltage. Resistor 230 is used to limit the current into the microcontroller 150. The resulting signal is also sent to a Port B, bit 0 for sensing by the software. Diodes 232 and 234, resistors 236, 238, 240, and transistor 242 are responsible for converting the negative excursions of the AC waveform into a positive 5 VDC signal and driving bit 1 of Port B as the data line for the microcontroller 150 to read.

Bit 0 of Port A is responsible for switching the AC waveform to the lamp as previously described using optoisolator 250, resistor 252, and TRIAC 254. The current through the optoisolator is limited by resistor 256. Resistor 258 and capacitor 260 are provided to snub TRIAC 254 and to prevent false triggering.

The speed of the fan motor is varied by altering the amplitude of the AC waveform delivered to it. Four individual speeds are offered using three resistors. Maximum speed is obtained when the 120 VAC line voltage bypasses the resistors altogether and is driven directly to the motor. This is accomplished by activating bit 5 of Port B on the microcontroller which is used to drive TRIAC 264 on through current limit resistor 266 shown in FIG. 7B.

Medium high speed operation is obtained by driving bit 4 of Port B which passes the AC line voltage through an external 40 ohm resistor 269 prior to driving the windings of the motor. This is accomplished in a manner identical to that as described in the high speed mode of operation only using resistor 270 and TRIAC 272.

Medium speed operation is obtained by driving bit 3 of Port B which passes the AC line voltage through an external 50 ohm resistor 273 prior to driving the windings of the motor. This is accomplished in a manner identical to that as described in the high speed mode of operation only using resistor 274 and TRIAC 276.

Low speed operation is obtained by driving bit 2 of Port B which passes the AC line voltage through an external 120 ohm resistor 277 prior to driving the windings of the motor. This is accomplished in a manner identical to that as described in the high speed mode of operation only using resistor 278 and TRIAC 280.

The direction of the motor is determined by which winding of the motor is driven directly by the line voltage and which one is driven out of phase using phasing capacitor 282. The motor will rotate in a direction to cause the air to flow upwards by driving bit 6 of Port B which passes the AC line voltage to the appropriate winding (MTREWINDTOP). This is accomplished using optoisolator 286, TRIAC 288 and current limit resistors 290 and 292.

Likewise, the motor will rotate in a direction to cause the air to flow downwards by driving bit 7 of Port B which passes the AC line voltage to the appropriate winding (MTRWINDBOT). This is accomplished using optoisolator 294, TRIAC 296 and current limit resistors 298 and 300.

A light circuit integrity check is formed by comparator 302, resistor 304 and decoupling capacitor 300 shown in FIG. 7A. When power is on to a lamp attachment and the circuit is not open, the output of comparator 302 will be a square wave. If the circuit is open and the power is applied, the output of comparator 302 will be at a steady level. This signal is applied to bit 7 of Port C and read by the microcontroller 150.

An electrically erasable programmable read only memory (EEPROM) 308 is decoupled by capacitor 310. The EEPROM 308 is used to store the ID for the fan controller 12 and also stores the memory settings. The microcontroller 150 communicates with the EEPROM 308 through Bit 4 and Bit 5 of Port C.

Transient absorbers 312 and 314 protect the fan controller circuitry from line transients and surges. Resistor 316 provides a return path for the wall switch to neutral when CommIn and LineIn are not connected together. Resistor network 194 is responsible for pulling up the eight lines of Port C.

The fan controller software is written in assembly language of the P1C16C57 microcontroller 150 and is identical for either the addressable or non-addressable versions of the product. A flowchart depicting the logic of the software is given in FIGS. 8A, 8B and 8C, and a description of each of the major functional blocks is as follows.

| | |
|---|---|
| Init. mtr, light, dir cmds and msg (320) | All system variables including the motor on/off command, the light on/off command, the fan direction command and the last received message buffer are initialized to a default state. |
| Call ECC (322) | All commands (On/Off for both motor and light as well as direction of fan) are stored with a single bit correction, double bit detection checksum. Prior to proceeding to the section of code that is responsible for turning the fan and/or light on, the command words are checked for validity. Should a multiple bit error be detected, then the corresponding command is reset to the off position. |
| Commands error free or correctable? (324) | The return code from the ECC routine is checked. If the error code indicates no errors, then no action is taken and normal processing continues. If a non-correctable error is detected, then the command in error is reset prior to continuing the processing. |
| Reset command in error (326) | If a multiple bit error is detected by the ECC routine, then the associated command is reset to an off state. |
| Pos. zero cross detect? (328) | This portion of code waits for the detection of the rising edge of the AC waveform prior to continuing the processing. |
| Call motor on check (330) | It is during the very beginning of the positive cycle of the AC waveform that the speed and direction of the motor are changed if so required. It is at this time that the motor command word and the direction command word are checked. |
| Call light pulse delay (332) | The only other task to be performed during the positive portion of the AC waveform is to provide the PWM delay for the light intensity control. This routine turns the light on if appropriate, and at the correct intensity level. |
| Neg. zero cross detect? (334) | This portion of code waits for the detection of the failing edge of the AC waveform prior to continuing the processing. |
| Call short light pulse delay (336) | After the negative zero crossing has been detected, it is necessary to turn the light on as soon as possible in order to obtain the brightest intensity as possible (assuming the intensity level is set to maximum or near maximum brightness). Therefore this routine will turn the light on immediately or with a small amount of delay as appropriate. Should the delay become so large as to intrude into the sampleing region of the data bit, then no action is taken and the light is turned on using the Long Light Delay subroutine. |
| Call read data (338) | At the appropriate time in the negative waveform, the data line is sampled and the appropriate action is taken. The sampling that takes place is only bit sampleing. Therefore, the entire control software is executed 17 times in order to receive one command word. |
| Call long light pulse delay (340) | Should the brightness of the light be dim enough as to exceed in time the sampling period of the data portion of the AC cycle, then the Short Light Pulse Delay subroutine does not turn the light on but rather this routine does as described above. |
| MOTOR ON CHECK (342) | This routine is responsible for determining if the fan motor should be on and if so, at what speed. |
| MTRCMD = 0? (344) | This is the variable which indicates whether the fan is on or off according to the following:<br>MTRCMD = 0 ... motor off<br>MTRCMD = 1 ... motor on. |
| Return (346) | If the MTRCMD = 0 which indicates the off state, then control is immediately returned to the main program. |
| Motor speed = 0? (348) | The speed of the motor is determined by the variable MTRSPD according to the following:<br>MTRSPD = 0 ... Ultra Low speed<br>MTRSPD = 1 ... Low speed<br>MTRSPD = 2 ... Med speed<br>MTRSPD = 3 ... High speed.<br>Once the desired speed of the motor has been determined, then the appropriate control bit can be set in order to select (or deselect) the appropriate capacitor. |
| Set mtr ULOW bit on (350) Motor speed = 1? (352) | The desired motor speed is Ultra Low, therefore, set the Ultra Low speed bit to on. The speed of the motor is determined by the variable MTRSPD according to the following:<br>MTRSPD = 0 ... Ultra Low Speed<br>MTRSPD = 1 ... Low speed<br>MTRSPD = 2 ... Med speed<br>MTRSPD = 3 ... High speed.<br>Once the desired speed of the motor has been determined, then the appropriate control bit can be set in order to selet (or deselect) the appropriate capacitor. |
| Set mtr LOW bit on (354) Motor speed = 2? (356) | The desired motor speed is Low, therefore, set the Low speed bit to on. The speed of the motor is determined by the variable MTRSPD according to the following:<br>MTRSPD = 0 ... Ultra Low Speed<br>MTRSPD = 1 ... Low speed<br>MTRSPD = 2 ... Med speed<br>MTRSPD = 3 ... High speed.<br>Once the desired speed of the motor has been determined, then the appropriate control bit can be set in order to selet (or deselect) the appropriate capacitor. |
| Set mtr MED bit on (354) Motor speed = 3? (360) | The desired motor speed is Medium, therefore, set the Medium speed bit to on. The speed of the motor is determined by the variable MTRSPD according to the following:<br>MTRSPD = 0 ... Ultra Low Speed<br>MTRSPD = 1 ... Low speed<br>MTRSPD = 2 ... Med speed<br>MTRSPD = 3 ... High speed.<br>Once the desired speed of the motor has been determined, then the appropriate control bit can be set in order to selet (or deselect) the appropriate capacitor. |
| Set mtr HIGH bit on (362) Return (364) | The desired motor speed is High, therefore, set the High speed bit to on. The fan has been set to the proper speed setting, therefore return control back to the main program. |
| LIGHT PULSE (366) | This routine is responsible for turning the light on at the proper PWM delay but only during the positive portion of the AC cycle. During the negative portion of the AC cycle, other routines are used to drive the light (Short Light Pulse and Long Light Pulse). |
| LIGHTCMD = 0? | This is the variable that indicates whether the light is On or Off according to the following:<br>LIGHTCMD = 0 ... light off<br>LIGHTCMD = 1 ... light on. |
| Return (370) | If the light command LIGHTCMD is '0' indicating the light should be off, then no further action is necessary and program control is returned back to the main routine. |
| Light delay count = 0? (372) | If the light delay cound is '0', then maximum brightness intensity is desired. Therefore, the light is immediately turned on without any delay. |
| Set lt. bit = 1 (374) | Setting the light bit to '1' will turn the light on. |
| ld. lght. dly. cnt. to timer (376) | If the light is not required to be full on, then the light delay count, which represents the total amount of delay to be incurred prior to turning the light on, will be loaded to the timer for counting down. |
| Return (380) | Once the light has been turned on, program control is returned back to the main calling routine. |

| | |
|---|---|
| Timeout (382) | This section of code simply waits for a timeout to occur which is the time associated with the PWM delay. |
| Set light on bit = 1 (384) | Setting the light on bit to '1' will turn the light on. |
| Delay (386) | Once the light has been turned on, the gate of the TRIAC must be held for a small amount of time in order to ensure the TRIAC will latch. Therefore, a small delay is used prior to resetting the light on bit in order to ensure complete TRIAC latching. |
| set light on bit - 0 (388) | Setting the light bit to zero will allow the light to turn off at the occurence of the first zero crossing. |
| Return (390) | Once the gate to the light has been removed, the program control can be returned back to the main calling program. |
| READ DATA BIT (392) | This routine is responsible for repeated sampling the data line at the appropriate time to obtain the value of the data bit read. Once all 17 bits have been read, this routine then checks to see if the address sent by the Wall Switch matches the address of the Fan Controller. |
| Is bit count = 0? (394) | The first check of the routine is to determine if the internal bit counter which represents the current number of bits read is zero. If the count is zero, this indicates that no bits have been read. Therefore, the first bit to be read must be a logic '0' since this is the definition of the START bit. However, is the count is not zero, then the data bit can be any state so the data is simply sampled and not checked whether it is a '0' or a '1'. |
| Is data = 0? (396) | If the bit count is equal to zero, then the first data bit to be read must be '0' (ie. the start bit) otherwise control is returned back to the main calling routine. In order for a data bit to be stored as a logic '1' or a logic '0', the data line must have been sampled 8 times in a row with the same value being returned each sample. If the value is different on one of the samplings, the entire 17 bit word is disregarded. |
| Return (398) | This position of code returns control back to the main program if either the first data bit is no a logic '0' or the data sampling failed to return the same value all 8 times. |
| Read data bit 8 times (402) | This portion of the code is responsible for reading the actual data bits as opposed to the Start bit. Again the data is sampled 8 times prior to storing in the memory of the controller. |
| All 8 reads match? (404) | If one of the samplings of the data line fails to match the other 7 samples, then processing is aborted and the 17 bit word is scrapped. |
| btcnt = 17 (406) | An internal bit counter is used to keep track of how many bits have been read in order to determine if the entire word has been sent or not. |
| btcnt = btcnt + 1 (408) | If the bit counter is not 17, then there are more bits to be read. Therefore, the bit counter is incremented by one and control is returned back to the main program. |
| Return (410) | This portion of code returns control back to the main program in expectation of another data bit transmittal. |
| Call Cksum (412) | Once all 17 bits have been read, then the message is first check for errors prior to any action being taken. This involves computing a checksum over the data and address portion of the command message and comparing it to a transmitted checksum which was generated by the Wall Switch. If the checksums do not agree exactly, then the entire 17 bit message is scrapped. |
| CKSUM Error? (414) | The return code from the Cksum routine is checked to determine if an error has been detected. |
| Return (416) | A checksum error has been detected, therefore, no further action is needed and control is returned back to the main program. |
| Address = 0? (418) | Once the message has been validated, the next step is to determine if the message applies to this particular fan controller (ie. does the address match). The first step in this determination is to determine if the address is '0' which represents the universal address in which all fans respond. |
| Address = ID? (420) | If the address which is sent is not '0', then it is checked to see if it matches the ID of the Fan Controller. |
| Call Msgdecode (422) | If either the address which was sent was '0' or matched the ID of the Fan Controller, then the data portion of that message is decoded by the routine MSGDECODE. |
| reset internal variables (424) | All variables unique to this routine are reset upon exiting the routine through this path. The possible reasons for exiting at this point are:<br>1. The message was decoded and the appropriate action taken<br>2. The Address was not the universal address<br>3. The Address did not match the ID<br>4. An error on a data bit read occurred. |
| Return (426) | This portion of code returns control back to the main calling routine. |
| MSGDECODE (428) | This routine is responsible for decoding the data portion of the transmitted message and acting on it accordingly. The command is decoded by this routine and the response takes the form of one of the following:<br>1. Alter the MTRCMD word which indicates the On/Off state of the motor<br>2. Alter the MTRSPD word which indicates the speed of the motor<br>3. Alter the DIRCMD word which indicates the direction of the motor.<br>4. Alter the LGHTCMD word which indicates the On/Off state of the light.<br>5. Alter the LGHTDLY word which controls the brightness of the motor.<br>Decoding each command is virtually identical and the responses only differ by the memory word which is modified. Therefore, a detailed explanation of this routine is not necessary. |
| SHORT LIGHT PULSE (444) | This routine is responsible for turning the light on during the negative portion of the AC cycle provided that either at full intensity or a brightness level which does not require the PWM delay time to overlap with the area of the AC waveform in which the data is sent. |
| LIGHT CMD = 0? (446) | If the LIGHTCMD word is '0', then the light is not intended to be off and therefore no further processing of this routine is necessary. |
| Return (448) | It has been determined that the light is intended to be off, therefore return control back to the main calling program. |
| Light delay count = 0? (450) | If the light delay count is zero, then the light is intended to be on at full intensity. Therefore, the light is immediately turned on without any further delay. |
| Light delay count > maxdelay (452) | If the light delay count which is used to control the PWM delay turn on exceeds a maximum delay, then this routine aborts and the light is turned on using the Long Light Pulse routine. |
| Return (454) | Program control is returned to the main program is the light delay count exceeds a maximum value. |
| Ld. light dly. count to timer (456) | Provided that the light delay count is within the acceptable limits, then this count is sent to a timer which is used to create the PWM delay. |
| Timeout? (458) | Further processing is inhibited until the delay timer has timed out. |
| Set light on bit = 1 (460) | Setting the light on bit to '1' will turn the light on. |

| | |
|---|---|
| Delay (462) | Once the light has been turned on, the gate on the TRIAC must be held for a small amount of time in order to ensure the TRIAC will latch. Therefore, a small delay is used prior to resetting the light on bit in order to ensure complete TRIAC latching. |
| set light on bit - 0 (464) | Setting the light on bit to zero will allow the light to turn off at the occurence of the first zero crossing. |
| Return (466) | Once the gate to the light has been removed, the program control can be returned back to the main calling program. |
| LONG LIGHT PULSE (468) | This routine is responsible for turning the light on during the negative portion of the AC cycle provided that the brightness level of the light is such that the PWM delay time exceeds the area of the AC waveform in which the data is sent. |
| LIGHTCMD = 0? (470) | If the LIGHTCMD word is '0', then the light is not intended to be off and therefore no further processing of this routine is necessary. |
| Return (472) | It has been determined that the light is intended to be off, therefore return control back to the main calling program. |
| Light delay count = 0? | If the light delay count is zero, then the light is intended to be on at full intensity. Therefore, the light is immediately turned on without any further delay. |
| Light delay count < mindelay (476) | If the light delay count which is used to control the PWM delay turn on is less than a minimum time delay, then this routine aborts because the light would have been turned on using the Short Light Pulse routine. |
| Return (478) | Program control is returned to the main program is the light delay count does not meet a minimum value. |
| Ld. light dly. count to timer (480) | Provided that the light delay count is within the acceptable limits, then this count is sent to a timer which is used to create the PWM delay. |
| Timeout? (482) | Further processing is inhibited until the delay timer has tmed out. |
| Set light on bit = 1 (484) | Setting the light on bit to '1' will turn the light on. |
| Delay (486) | Once the light has been turned on, the gate of the TIAC must be held for a small amount of time in order to ensure the TRIAC will latch. Therefore, a small delay is used prior to resetting the light on bit in order to ensure complete TRIAC latching. |
| set light on bit - 0 (488) | Setting the light on bit to zero will allow the light to turn off at the occurence of the first zero crossing. |
| Return (490) | Once the gate to the light has been removed, then program control can be returned back to the main calling program. |
| ERCHK/CRCT (492) | Each command word is stored with a single bit error correction, double bit error detection code. Each and every pass of the control software, which executes at a rate of 60 Hz, checks the stored commands for possible corruption due to power failure, noise on the AC line, soft memory failures, etc. If the command has a single bit error, the bit is corrected and processing continues as normal. If a multiple bit error is detected, then the command is reset to a known state (usually the OFF state) and processing continues as normal. |
| Generate checkbits (494) | Check bits for each of the stored command words are generated in order to be compared to the stored checkbits. |
| Compare to strd checkbits (496) | The generated checkbits are compared to the stored checkbits to determine if an error has occured. |
| Match? (498) | If the checkbits match exactly, then no error has occured. |
| Set retcode = 0 (500) | The return code is set to a value to indicate that no errors have been detected. |
| Return (502) | Program control is returned to the calling routine. |
| Correctable? (504) | An error has been detected. This portion of the code determines if it is a single bit or multiple bit error. |
| Set retcode = 1 (506) | A multiple bit error has been detected. Therefore, set the appropriate retcode and return program control to the calling routine. |
| Correct data (510) | A correctable error has been detected. Therefore, correct the data bit in error. |
| Return (512) | Program control is returned to the calling routine. |
| Set retcode = 0 (514) | The return code is set to a value to indicate that no errors have been detected. |
| Return (516) | Program control is returned to the calling routine. |

By way of example, in an illustrative system, voltage regulator 158 in a national Semiconductor 78L05 fixed voltage regulator, undervoltage sensor 168 a Motorola MC 34064 undervoltage sensing circuit, phototransistor 184 is Fairchild FPT 100, comparators 200 and 302 are National Semiconductor LM2903 dual comparators, TRIACS 254,288 and 296 are Teccor Q4004L3, TRIACS 264, 272, 276 and 280 are Teccor L4004F31, optoisolators 250, 286 and 294 are Motorola MOC3023, EPROM 308 is a Microchip 24C01A1P serial $E^2$PROM and transient absorbers 312 and 314 are Panasonic ER2-COSDK241V.

The electrically operated heater means operatively associated with fan motor 14 for maintaining the temperature of the motor bearings at a level sufficient to prevent condensation is shown in FIG. 9 in conjunction with FIG. 7B. The electrically operated heater means, generally designated 520, is shown in FIG. 7B connected in a branch of the a.c. power circuit which supplies motor 14. As shown in FIG. 9, heater means 520 is in the form of a heater strip which is placed around and in contact with the housing 522 of fan motor 14. Heater means 520 is in the form of a silicone rubber heating strip manufactured by Electro-Flex Heat Inc. of Bloomfield, Connecticut wherein a resistive heating element is embodied in the silicone rubber strip which has an adhesive backing for attachment to motor housing 522 and which is provided with a cable 524 and electrical connector 526 for making electrical connection thereto. As shown in FIG. 9 connector 526 is secured to the fan controller circuit board 528 which, in turn, is mounted on fan motor 14 by suitable brackets as shown. Connector 526 provides the electrical connection between heater means 520 and the a.c. line supplying motor 14 through fan controller 12 as shown in FIG. 7B.

The following description deals specifically with the installation and wiring of the control system at a job site. However, since the fan controller 12 is mounted internal to the ceiling fan at the factory the issues associated with this interface also are discussed. No wiring of the fan controller board 528 is required during system installation. Installation of any of the control products at a job site requires as a minimum the setting of the fan controller address as desired, but not required if all wall switches are non-addressable, and the wiring of the wall switch(es) to the ceiling fan(s). The details of these procedures are discussed as follows.

The mounting of the addressable and non-addressable units requires a single gang outlet box. Both units use the same wiring configuration which does not require the AC neutral to be available at the wall switch. During installation the black wire is power in and the red wire is power/control out to the fan. This will be discussed in detail presently. The wall switch in either configuration is capable of drawing up to 1000 watts of load.

The mounting of the fan is the same regardless of the numbers and types of wall switches used. The installation of the fan only requires the wiring of the LINE and the NEUTRAL wires. It should be noted that both LINE and NEUTRAl must reside on the same branch circuit.

The fan controller 12 is assembled as an integral part of the ceiling fan and this assembly takes place at the factory. The ability to field retrofit the fan controller is not required. The fan controller is in the form of a printed circuit board no larger than 5×2.5 inches. Mounting of the fan controller board is accomplished by a mounting plate mounted to the fan motor by the screws located in the center of the mounting plate. The fan controller printed circuit board is then mounted to the mounting plate by four snap-in standoffs. The fan controller must have available the two motor feed with the appropriate RETURN, and the LINE and RETURN wires to the lamp, and the AC power and communication lines from the wall switch 16.

The fan control system 10 is intended to be wired on 120 VAC electrical service using standard 2 wire (Line and Neutral). No special cabling or line receiver/buffers are required. Furthermore, the wiring requirements of both the wall switch 16 and the fan controller 12 are flexible enough to allow most installations to be performed without adding to or modifying the existing AC wiring. The most common AC wiring configurations are described herein. It should be noted that since the wall switch is nothing more than a sophisticated means for switching the AC voltage to the fan controller 12, the drawings for the various wiring configurations use a simple block diagram to convey the function of the wall switch 16.

The wall power wiring configuration refers to the situation where both the LINE and NEUTRAl legs of the AC power are available at the wall switch 16. In this case the neutral leg of the AC power bypasses the wall switch 16 and goes directly to the fan controller 12.

Figure 10:
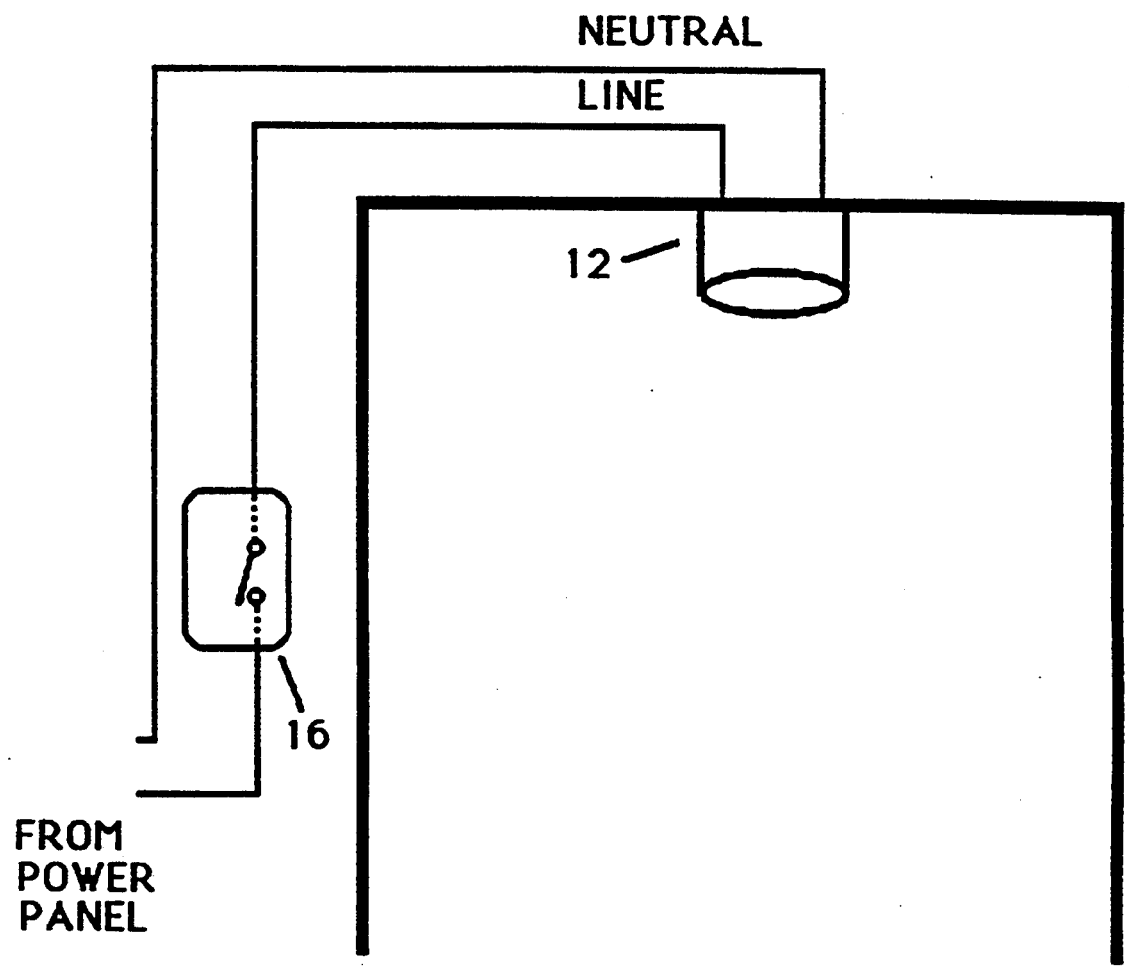

The single switch-single fan configuration is the simplest of the four configurations. It consists of a single wall switch 16 controlling a single fan controller 12. In this case, the advantage of addressability is not used. The fan, regardless of its address, will respond. The wiring for this configuration is shown in FIG. 10.

Figure 11:
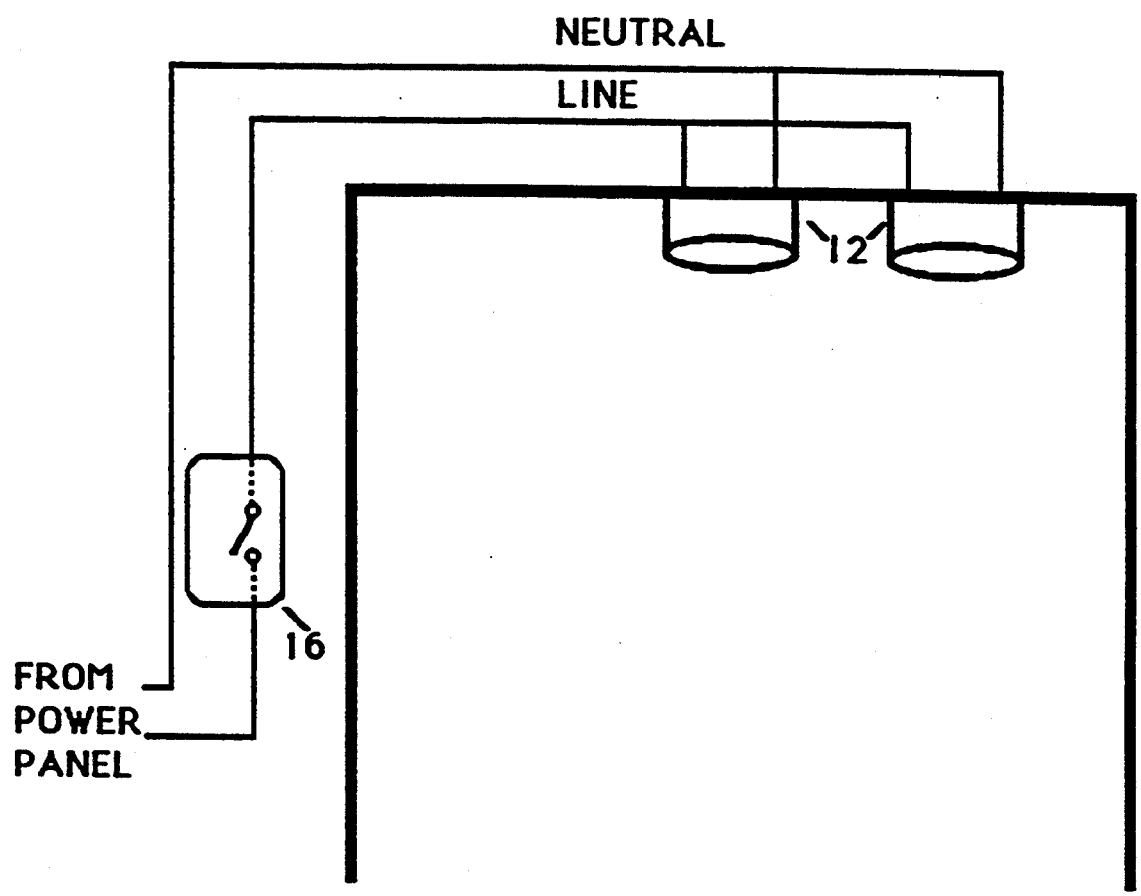

In the single switch/multiple fans configuration, a single wall switch would control many fans. Each fan could (but need not) have a unique address. For example, if it was known that two fans would always be controlled identically, they could be assigned the same address. The wall switch would be wired to each of the fan controllers. When a command is sent by the wall switch, the appropriate fan controllers would respond. The wiring for this configuration is shown in FIG. 11.

Figure 12:
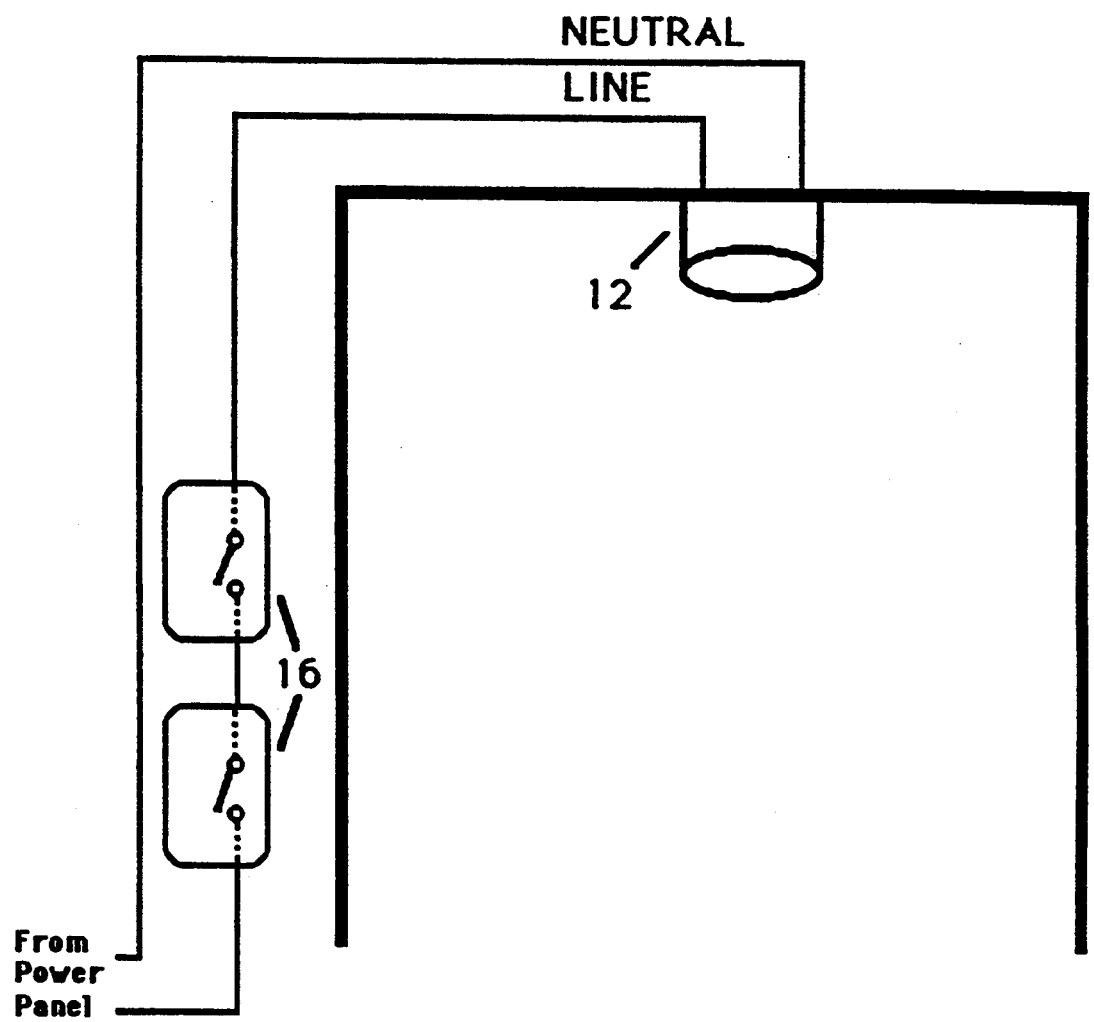
Figure 13:
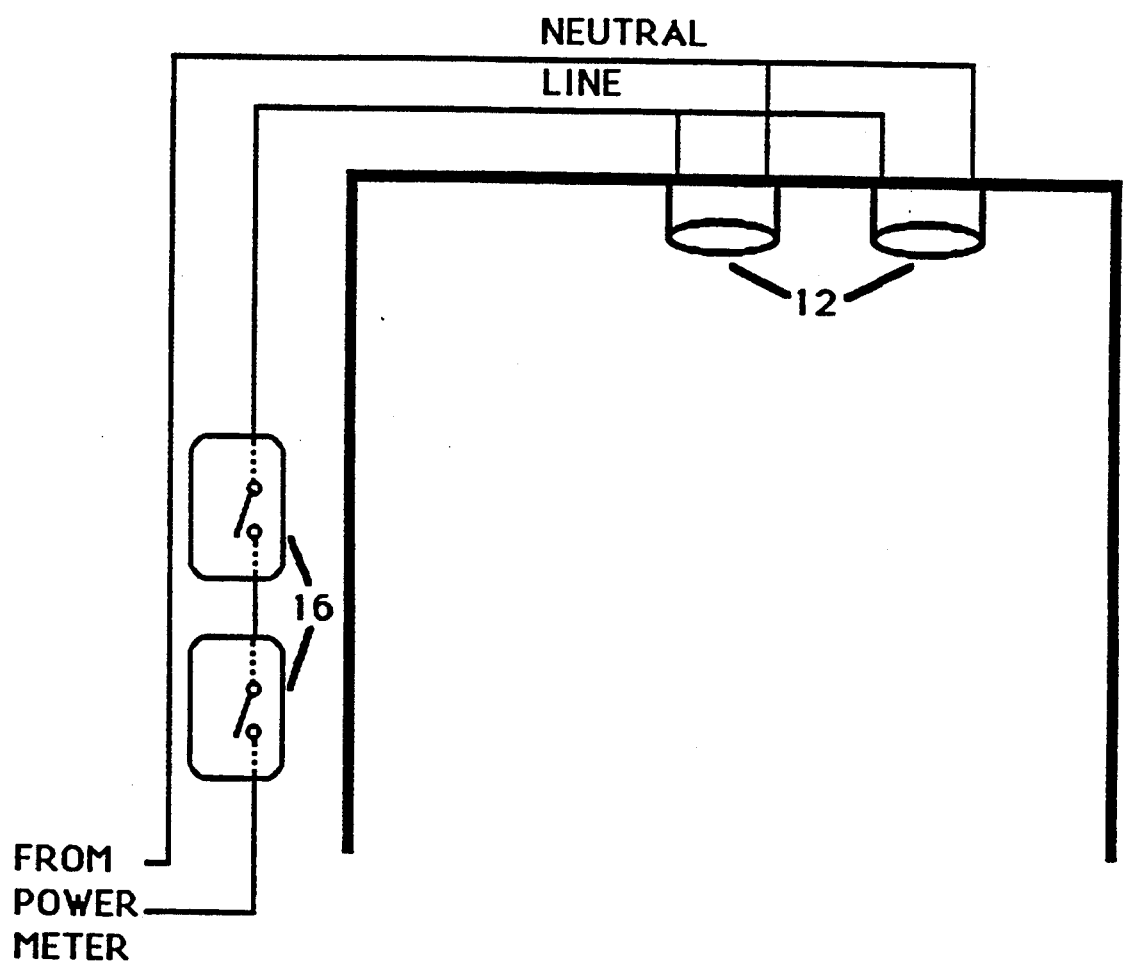

In the multiple switch/single fan configuration, a single fan is being controlled by multiple wall switches. This allows multiple control points for a physically large area. In this mode of operation the concept of addressability serves little purpose. The fan controller is set to any address and the non-addressable wall switches are used. System safeguards to prevent the potential of simultaneous wall switch activation are not required. The wiring for this configuration is shown in FIG. 12. A maximum of three wall switches can be wired in series.

In the multiple switch/multiple fan configuration, multiple wall switches 16 control multiple fans. This configuration is essentially the combination of the single switch/multiple fan and the multiple switch/single fan. It allows multiple control points for multiple fans. The wiring for this configuration is given in FIG. 13.

The no wall power wiring configuration refers to the situation where the line and neutral legs of the AC power are available at the fan controller(s) locations only and not at the remote wall switch. The wall switch and fan controller are identical to that used in the previous configurations and operate identically as when used under the wiring configurations previously described.

Figure 14:
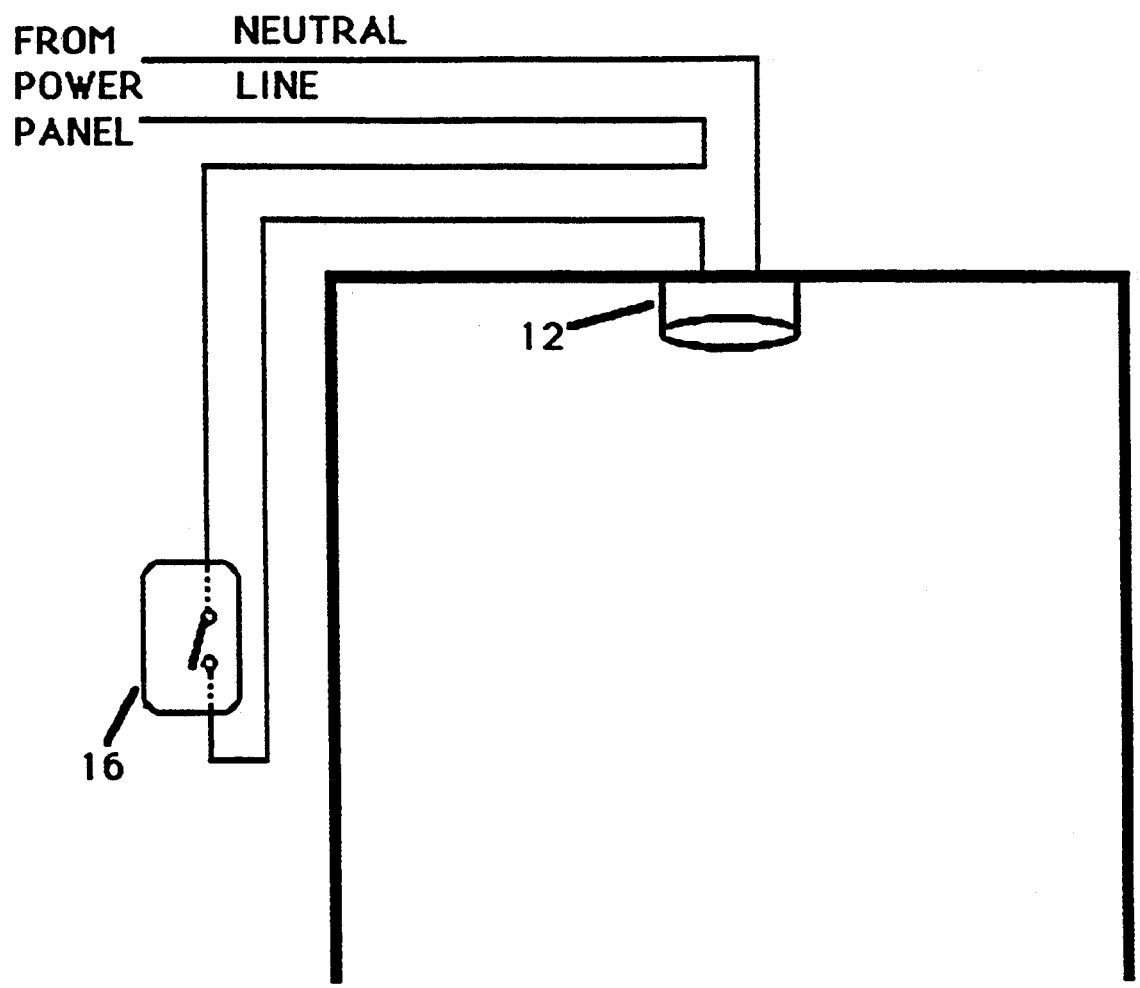

The single switch/single fan configuration is the simplest of the four configurations. It consists of a single wall switch controlling a single fan controller. In this case, the advantage of addressability is not used. The fan regardless of its address will respond. The wiring for this configuration is shown in FIG. 14.

Figure 15:
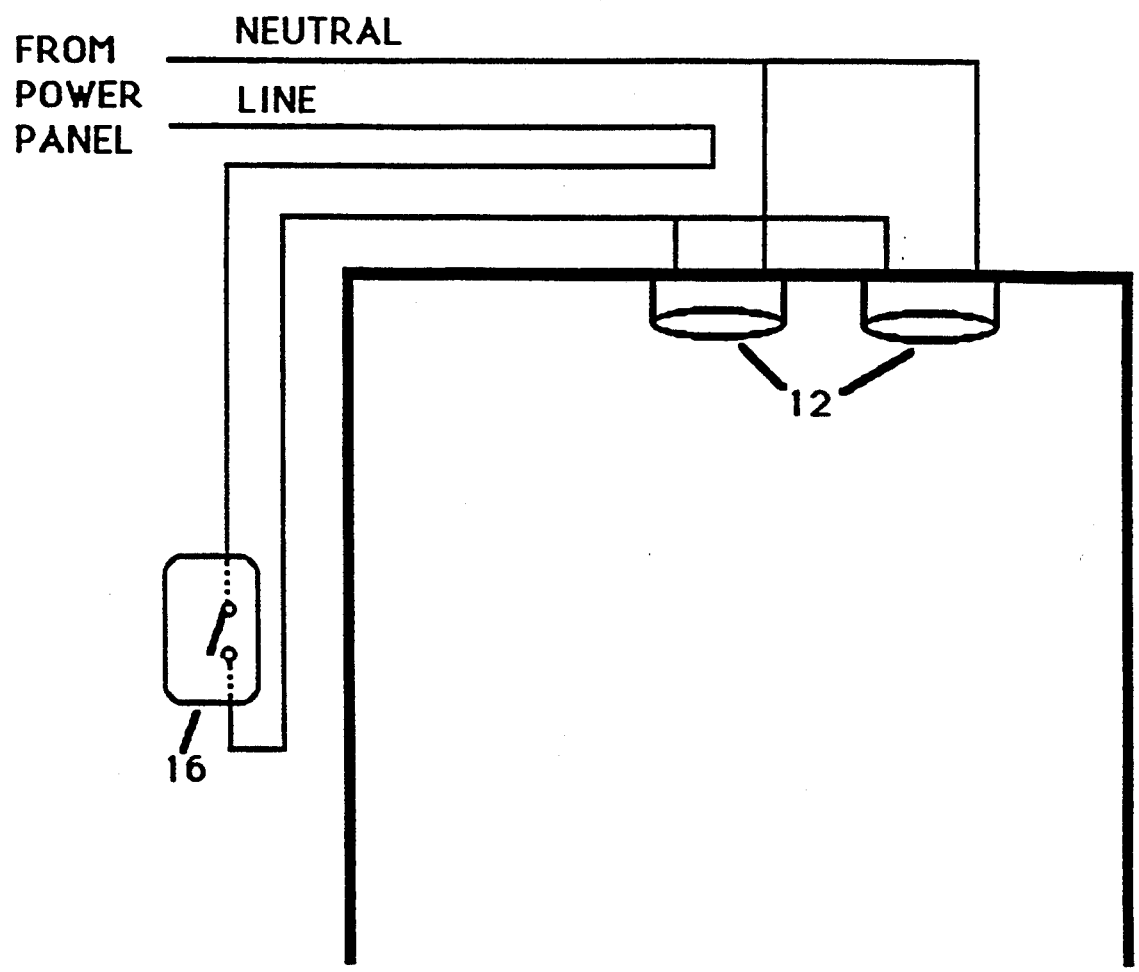

In the single switch/multiple fans configuration, a single wall switch would control many fans. Each fan could (but need not), have a unique address. For example, if it was known that two fans would always be controlled identically, they could be assigned the same address. The wall switch would be wired to each of the fan controllers. When a command is sent by the wall switch, the appropriate fan controllers would respond. The wiring for this configuration is shown in FIG. 15.

Figure 16:
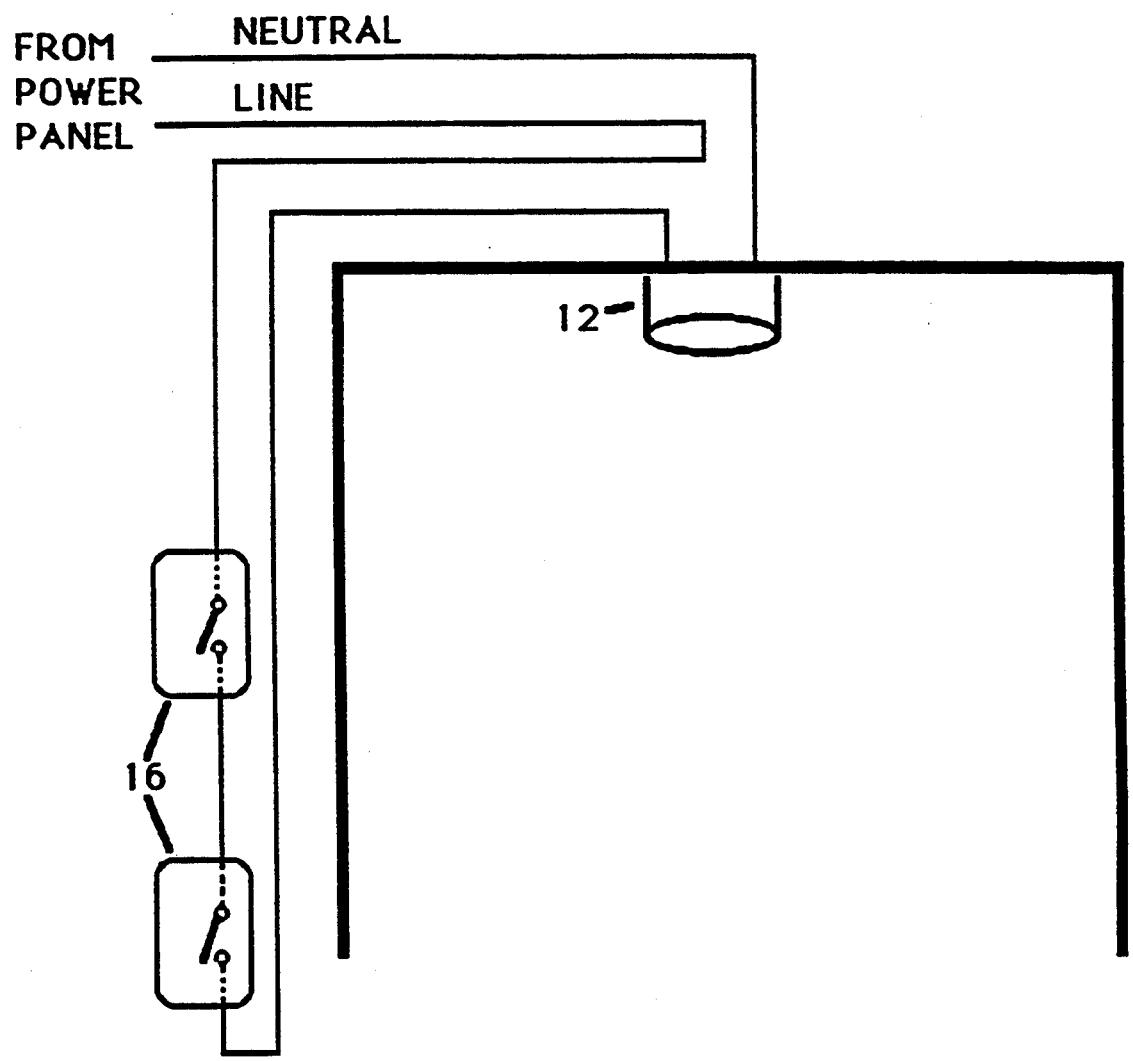

In the multiple switch/single fan configuration, a single fan is being controlled by multiple wall switches. This allows multiple control points for a physically large area. In this mode of operation, again the concept of addressability serves little purpose. The fan controller is set to any address and the non-addressable wall switches would be used. System safeguards to prevent the potential of simultaneous wall switch activation are not required. The wiring for this configuration is shown in FIG. 16. A maximum of three wall switches can be wired in series.

Figure 17:
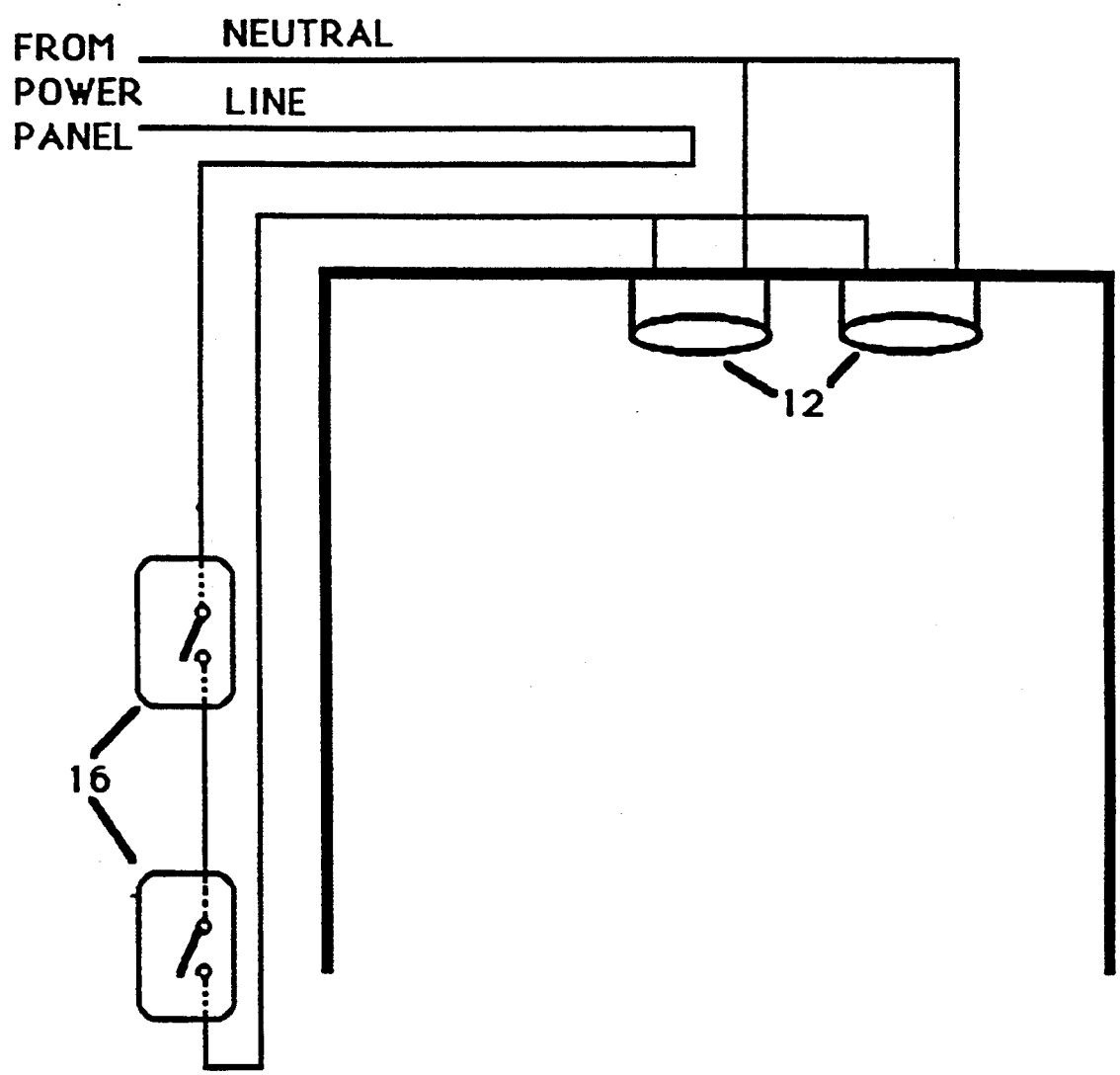

In the multiple switch/multiple fans configuration, multiple wall switches control multiple fans. This configuration is essentially the combination of the single switch/multiple fan and the multiple switch/single fan. It allows multiple control points for multiple fans. The wiring for this configuration is shown in FIG. 17.

As previously described, the system of the present invention permits the user to send a command to an individual fan, i.e. the addressability feature, or to all fans simultaneously. On the wall switch 16 the settable indicator in the form of pushwheel 32 enables the user to select the fan number he wishes to send a command to. The settings are A for all fans, 1 through 8 for individual fans and M for the simultaneous control of all fans. The user simply sets the fan number or letter desired, touches the control key, and the appropriate fan(s) will respond. At the time of installation, the owner chooses the address numbers for the fans and follows a simple procedure to set this ID number in each fan. It is possible to have two or more fans set with the same ID number if one wants to control them together. If it is decided at any time to change these number assignments, the fan ID numbers can be easily changed to a new pattern.

After initial experimentation with a fan system, the owner will usually decide on a few preferred settings of light level, fan speed and fan direction for use at different times, e.g. daytime, evening, night. The system of the present invention makes it extremely easy to store in memory up to 4 of these preferred settings, recall from memory at any time one of these settings by pressing a single key, and turn off all fans and lights with a single key. To invoke these features, the fan number indicator, i.e. pushwheel 32, is set to "M" and the appropriate keys are used. Settings are retained in memory even if power is interrupted. The system will retain in memory the fan and light settings in use when the unit is turned off, and will recall these when it is subsequently turned on.

It is therefore apparent that the present invention accomplishes its intended objects. While embodiments of the present invention have been described in detail, that is for the purpose of illustration, not limitation.

What is claimed is:

1. A ceiling fan control system comprising:
   a) a fan controller operatively connected to the motor of a ceiling fan for controlling the speed and direction of rotation of said fan in response to command signals received by said controller;
   b) control switch means adapted to be located remote from said fan at a manually accessible location, said switch means including a plurality of operator members each providing a function command when manually operated, said switch means including programmed processor means for converting said function commands provided by said operator members into speed and direction command signals for use by said fan controller and said switch means including circuit means connected to an existing a.c. power line for providing d.c. power for operating said processor means, said circuit means comprising means for controlling the half cycle of the a.c. waveform from said a.c. power line in a manner preventing transmission of a.c. power during a portion of said half cycle, energy storage means operatively connected to said controlling means for storing energy during said portion of said half cycle and means operatively connected to said energy storage means for utilizing the stored energy to provide d.c. power for operating said processor means; and
   c) means for providing a communication link between said control switch means and said fan controller for transmitting said command signals from said control switch means to said fan controller.

2. The control system according to claim 1, wherein said means for providing a communication link comprises the existing a.c. power line.

3. The control system according to claim 1, wherein said means for providing a communication link requires only 2-wire cabling and has no-neutral capability.

4. The control system according to claim 1, further including a plurality of fan controllers and wherein said control switch means includes manually operated means for providing input address information for selecting particular groups of said fan controllers, each of said groups including at least one fan controller.

5. The fan control system according to claims 4, wherein said control switch means includes means for addressing all of said groups simultaneously.

6. The control system according to claim 1, further including a lamp associated with said fan and means operatively associated with said lamp for controlling the brightness thereof in response to command signals received thereby, and wherein said control switch means includes additional ones of said operator members and means for converting commands from said operator members into brightness command signals for use by said brightness control means.

7. The control system according to claim 1, further including a lamp associated with said fan and means operatively associated with said lamp for controlling the brightness thereof and wherein said control switch means includes additional operator members for providing distinct brightness commands and said programmed processor means of said control switch means converts said commands into brightness command signals for use by said fan controller and wherein said fan controller includes processor means for converting said brightness command signals received by said fan controller into signals for controlling the brightness of said lamp.

8. A ceiling fan control system comprising:
   a) a plurality of fan controllers operatively connected to corresponding motors of a corresponding plurality of ceiling fans for controlling the speed and direction of rotation of said fans in response to command signals received by said controllers;
   b) control switch means adapted to be located remote from said fans at a manually accessible location, said switch means including a plurality of operator members each providing no more than one distinct primary function command when manually operated, said switch means including means for converting said function commands provided by said operator members into speed and direction command signals for use by said fan controller, said switch means including manually operated means for providing input address information for selecting particular groups of said fan controllers, each of said groups including at least one fan controller, said control switch means including means for issuing predetermined operational settings for said groups; and
   c) means for providing a communicati link between said control switch means and said fan controllers for transmitting said command signals from said control switch means to said fan controllers.

9. A ceiling fan control system comprising:
   a) a fan controller operatively connected to the motor of a ceiling fan for controlling the speed and direction of rotation of said fan, said controller comprising means for controlling the supply of current to said motor and processor means for converting command signals received by said fan controller into signals for controlling said current supply control means;
   b) manually operated control switch means adapted to be located remote from said fan at a manually accessible location, said switch means including means for converting manual input commands into speed and direction command signals for use by said fan controller;
   c) means for providing a communication link between said control switch means and said fan controller for transmitting said command signals from said control switch means to said fan controller;
   d) blade rotation sensor means operatively associated with said fan; and
   e) means operatively coupled to said blade rotation sensor means and connected to said processor means so that power to said fan is shut off if the fan blades are not rotating.

10. A ceiling fan control system comprising:

a) a fan controller operatively connected to the motor of a ceiling fan for controlling the speed and direction of rotation of said fan, said controller comprising means for controlling the supply of current to said motor and processor means for converting command signals received by said fan controller into signals for controlling said current supply control means;
b) manually operated control switch means adapted to be located remote from said fan at a manually accessible location, said switch means including means for converting manual input commands into speed and direction command signals for use by said fan controller;
c) means for providing a communication link between said control switch means and said fan controller for transmitting said command signals from said control switch means to said fan controller;
d) a lamp associated with said fan and means operatively associated with said lamp for controlling the brightness thereof, said processor means converting said command signals received by said fan controller into signals for controlling the brightness of said lamp; and
e) lamp circuit integrity checking means operatively connected to said lamp and to said processor means so that if the lamp circuit is open due to bulb burn-out, breakage or other damage or electrical failure, power to the lamp is shut off.

11. A ceiling fan control system comprising:
a) a plurality of fan controllers operatively connected to corresponding motors of a corresponding plurality of ceiling fans for controlling the speed and direction of rotation of said fans, each of said controllers comprising means for controlling the supply of current to said motor and processor means for converting command signals received by said fan controller into signals for controlling said current supply control means;
b) control switch means adapted to be located remote from said fans at a manually accessible location, said switch means including a plurality of operator members each providing no more than one distinct primary function command when manually operated, said switch means including processor means for converting said function commands provided by said operator members into speed and direction command signals for use by said fan controller, said control switch means including manually operated means for providing input address information to said processor means for providing address signals for selecting particular ones of said fan controllers and said processor means of each of said fan controllers including means responsive to a particular address signal for selecting that particular fan controller, said control switch means including means for issuing predetermined operational settings for said fan controllers; and
c) means for providing a communication link between said control switch means and said fan controllers for transmitting said command signals from said control switch means to said fan controllers.

12. A ceiling fan control system comprising:
a) a plurality of fan controllers operatively connected to corresponding motors of a corresponding plurality of ceiling fans for controlling the speed and direction of rotation of said fans, each of said controllers comprising means for controlling the supply of current to said motor and processor means for converting command signals received by said fan controller into signals for controlling said current supply control means, each of said controllers including memory means operatively connected to said processor means;
b) control switch means adapted to be located remote from said fans at a manually accessible location, said switch means including a plurality of operator members each providing no more than one distinct primary function command when manually operated, said switch means including processor means for converting said function commands provided by said operator members into speed and direction command signals for use by said fan controllers, said control switch means including manually operated means for providing input address information to said processor means for providing address signals for selecting particular ones of said fan controllers and said processor means of each of said fan controllers including means responsive to a particular address signal for selecting that particular fan controller, said control switch means including means for providing commands including memory recall of user pre-defined configurations, storing of new configurations, fan controller identification and an off condition for all fans which commands are processed by said processor means in conjunction with said memory means of said controllers; and
c) means for providing a communication link between said control switch means and said fan controller for transmitting said command signal from said control switch means to said fan controller.

* * * * *